(12) United States Patent
Adams

(10) Patent No.: US 9,347,846 B2
(45) Date of Patent: May 24, 2016

(54) CAPACITANCE-BASED PRESSURE SENSOR INCLUDING PRESSURE VESSEL(S)

(71) Applicant: Kionix, Inc., Ithaca, NY (US)

(72) Inventor: Scott G. Adams, Ithaca, NY (US)

(73) Assignee: Kionix, Inc., Ithaca, NY (US)

( * ) Notice: Subject to any disclaimer, the term of this patent is extended or adjusted under 35 U.S.C. 154(b) by 246 days.

(21) Appl. No.: 14/224,535

(22) Filed: Mar. 25, 2014

(65) Prior Publication Data

US 2015/0276532 A1  Oct. 1, 2015

(51) Int. Cl.
*G01L 9/00* (2006.01)
*H01G 5/40* (2006.01)
*H01G 13/00* (2013.01)
*G01L 13/02* (2006.01)

(52) U.S. Cl.
CPC ............. *G01L 9/0073* (2013.01); *G01L 9/0086* (2013.01); *G01L 9/0095* (2013.01); *G01L 13/021* (2013.01); *H01G 5/40* (2013.01); *H01G 13/00* (2013.01); *Y10T 29/43* (2015.01)

(58) Field of Classification Search
None
See application file for complete search history.

(56) References Cited

U.S. PATENT DOCUMENTS

| | | | |
|---|---|---|---|
| 5,501,893 A | 3/1996 | Laermer et al. | |
| 6,093,330 A | 7/2000 | Chong et al. | |
| 6,239,473 B1 | 5/2001 | Adams et al. | |
| 6,295,875 B1 * | 10/2001 | Frick | G01L 9/0072 73/718 |
| 6,328,647 B1 * | 12/2001 | Traudt | F24F 11/022 454/255 |
| 2006/0278007 A1 * | 12/2006 | Harasyn | G01L 13/025 73/723 |
| 2009/0000393 A1 * | 1/2009 | Nyfors | G01F 1/363 73/861.19 |
| 2010/0132472 A1 * | 6/2010 | Willcox | G01L 23/125 73/718 |
| 2012/0205752 A1 | 8/2012 | Blackmer et al. | |
| 2015/0276528 A1 * | 10/2015 | Willcox | G01L 9/0072 73/718 |

* cited by examiner

*Primary Examiner* — Andre Allen
(74) *Attorney, Agent, or Firm* — Wade IP Law LLC

(57) ABSTRACT

Techniques are described herein that perform capacitance-based pressure sensing using pressure vessel(s). A pressure vessel is an object that has a cross section that defines a void. The void has a shape that is configured to change based on a change of pressure difference between a cavity pressure in a cavity in which at least a portion of the pressure vessel is suspended and a vessel pressure in the pressure vessel. The pressure vessel may be formed in the shape of an enclosed loop (e.g., along a path that is perpendicular to the cross section), resulting in a looped pressure vessel. For instance, an end of the pressure vessel may be connected to another end of the pressure vessel to form the enclosed loop.

28 Claims, 19 Drawing Sheets

CAPACITANCE-BASED PRESSURE SENSOR INCLUDING PRESSURE VESSEL(S)

BACKGROUND

1. Technical Field

The subject matter described herein relates to pressure sensors.

2. Background

Micromechanical devices commonly are used to create many types of sensors, including but not limited to pressure sensors, accelerometers, gyroscopes, and magnetometers. As time progresses, customers continue to demand a reduction in the size, cost, and current consumption of such sensors through a consolidation of the sensors into combination sensors. However, different fabrication processes often are used to fabricate different types of sensors. Using a different fabrication process for each type of sensor complicates the integration.

Conventional pressure sensors typically are formed in electronic packages that have a membrane (a.k.a. diaphragm) extended over a cavity in a substrate, such that the membrane is coplanar with the substrate. A relative change of a pressure above the membrane with respect to a pressure below the membrane causes a net force that deforms the membrane. Capacitance-based principles can be used to detect a magnitude of the change, such that a greater capacitance corresponds to a greater magnitude.

For example, strain sensors may be incorporated into the membrane. The strain sensors may include a piezoelectric material that is formed a silicon substrate of the pressure sensor from which the membrane may be made. In another example, an electrode may be placed in the cavity, and as the membrane moves closer to the electrode due to deformation of the membrane, the capacitance increases. In accordance with this example, when a voltage is applied between the membrane and the electrode, a difference between the charges on the membrane and the electrode is related to their separation.

In such conventional pressure sensors, supports for the membrane are attached to the surrounding electronic package. When the electronic package is attached to a circuit board, temperature and stress changes can be transmitted into the supports for the membrane and thereby create a false reading of the magnitude of the change. Moreover, it is well-known that piezoelectric materials are relatively sensitive to changes of temperature.

Calibration techniques sometimes may be used to remove inaccuracies of the reading that are based on the temperature and stress changes if the temperature and stress changes are due to tensions internal to the sensor, such as those arising from differing coefficient of thermal expansion (CTE) values among materials internal to the sensor. For instance, a reference sensing element may be used in combination with a primary sensing element so that a differential reading between the primary and reference sensing elements may be made. However, using such calibration techniques may consume a substantial amount of area on the substrate, increase cost of the sensor, and/or not adequately remove the inaccuracies. Furthermore, compensation for stress changes that are not internal to the sensor may not be possible.

SUMMARY

Various approaches are described herein for, among other things, performing capacitance-based pressure sensor techniques using pressure vessel(s). A pressure vessel is an object that has a cross section that defines a void. The void has a shape that is configured to change based on a change of pressure difference between a cavity pressure in a cavity in which at least a portion of the pressure vessel is suspended and a vessel pressure in the pressure vessel. In a metaphorical example, the pressure vessel may resemble a tube or hose having side(s) that deform when a pressure is exerted thereon. The pressure vessel may be formed in the shape of an enclosed loop, resulting in a looped pressure vessel. For instance, an end of the pressure vessel may be connected to another end of the pressure vessel to form the enclosed loop. In another metaphorical example, a looped pressure vessel may resemble a hula hoop or a tire tube. The examples mentioned above are metaphorical and are provided merely for illustrative purposes. These examples are not intended to be limiting.

An example pressure sensor is described that includes a semiconductor substrate, a pressure vessel, and a capacitive structure. The semiconductor substrate includes a cavity. The pressure vessel has a cross section that defines a void. The void has a shape that is configured to change based on a change of pressure difference between a cavity pressure in the cavity and a vessel pressure in the pressure vessel. At least a portion of the pressure vessel is suspended in the cavity. The capacitive structure is coupled to the portion of the pressure vessel. The capacitive structure is configured to provide a capacitance that changes with the shape of the void.

Example methods are also described. In a first example method, a semiconductor substrate that includes a cavity is provided. A pressure vessel having a cross section that defines a void is fabricated. The void has a shape that is configured to change based on a change of pressure difference between a cavity pressure in the cavity and a vessel pressure in the pressure vessel. At least a portion of the pressure vessel is suspended in the cavity. A capacitive structure coupled to the portion of the pressure vessel is fabricated. The capacitive structure is configured to provide a capacitance that changes with the shape of the void.

In a second example method, at least a support portion of a pressure vessel that is in a shape of an enclosed loop is embedded in a semiconductor substrate external to a cavity in the semiconductor substrate in which the pressure vessel is suspended. The pressure vessel has a cross section that defines a void. The void has a shape that is configured to change based on a change of pressure difference between a cavity pressure in the cavity and a vessel pressure in the pressure vessel. The enclosed loop has an inner perimeter and an outer perimeter. First and second metallization layers are provided on respective inner and outer perimeters of the enclosed loop. The first metallization layer is electrically connected to a portion of the semiconductor substrate that is within the inner perimeter of the enclosed loop. A first metallization trace is routed from the portion of the semiconductor substrate that is within the inner perimeter of the enclosed loop to a first electrode on a top surface of the semiconductor substrate that is outside an isolation barrier that surrounds the cavity. A second metallization trace is routed from the second metallization layer to a second electrode on the top surface of the semiconductor substrate that is outside the isolation barrier.

In a third example method, a cavity pressure is received in a cavity that is included in a semiconductor substrate of a pressure sensor. A vessel pressure is received in a pressure vessel of the pressure sensor. At least a portion of the pressure vessel is suspended in the cavity. A capacitance that changes with a shape of a void that is defined by a cross section of the pressure vessel is measured using a capacitive structure that is coupled to the portion of the pressure vessel.

Example systems are also described. A first example system includes cavity logic, vessel logic, and capacitor logic. The cavity logic is configured to provide a semiconductor substrate that includes a cavity. The vessel logic is configured to fabricate a pressure vessel having a cross section that defines a void. The void has a shape that is configured to change based on a change of pressure difference between a cavity pressure in the cavity and a vessel pressure in the pressure vessel. At least a portion of the pressure vessel is suspended in the cavity. The capacitor logic is configured to form a capacitive structure coupled to the portion of the pressure vessel. The capacitive structure is configured to provide a capacitance that changes with the shape of the void.

A second example system includes embedding logic, metallization logic, and routing logic. The embedding logic is configured to embed at least a support portion of a pressure vessel that is in a shape of an enclosed loop in a semiconductor substrate external to a cavity in the semiconductor substrate in which the pressure vessel is suspended. The pressure vessel has a cross section that defines a void. The void has a shape that is configured to change based on a change of pressure difference between a cavity pressure in the cavity and a vessel pressure in the pressure vessel. The enclosed loop has an inner perimeter and an outer perimeter. The metallization logic is configured to provide first and second metallization layers on respective inner and outer perimeters of the enclosed loop. The first metallization layer is electrically connected to a portion of the semiconductor substrate that is within the inner perimeter of the enclosed loop. The routing logic is configured to route a first metallization trace from the portion of the semiconductor substrate that is within the inner perimeter of the enclosed loop to a first electrode on a top surface of the semiconductor substrate that is outside an isolation barrier that surrounds the cavity. The routing logic is further configured to route a second metallization trace from the second metallization layer to a second electrode on the top surface of the semiconductor substrate that is outside the isolation barrier.

A third example system includes measurement logic. A cavity that is included in a semiconductor substrate of a pressure sensor receives a cavity pressure. A pressure vessel of the pressure sensor receives a vessel pressure. At least a portion of the pressure vessel is suspended in the cavity. A capacitive structure is coupled to the portion of the pressure vessel. The measurement logic measures a capacitance that changes with a shape of a void that is defined by a cross section of the pressure vessel using the capacitive structure.

Example computer program products are also described. A first example computer program product includes a computer-readable medium having computer program logic recorded thereon for enabling a processor-based system to fabricate a pressure sensor. The computer program logic includes a first program logic module, a second program logic module, and a third program logic module. The first program logic module is for enabling the processor-based system to provide a semiconductor substrate that includes a cavity. The second program logic module is for enabling the processor-based system to fabricate a pressure vessel having a cross section that defines a void. The void has a shape that is configured to change based on a change of pressure difference between a cavity pressure in the cavity and a vessel pressure in the pressure vessel. At least a portion of the pressure vessel is suspended in the cavity. The third program logic module is for enabling the processor-based system to fabricate a capacitive structure coupled to the portion of the pressure vessel. The capacitive structure is configured to provide a capacitance that changes with the shape of the void.

A second example computer program product includes a computer-readable medium having computer program logic recorded thereon for enabling a processor-based system to fabricate a pressure sensor. The computer program logic includes a first program logic module, a second program logic module, and a third program logic module. The first program logic module is for enabling the processor-based system to embed at least a support portion of a pressure vessel that is in a shape of an enclosed loop in a semiconductor substrate external to a cavity in the semiconductor substrate in which the pressure vessel is suspended. The pressure vessel has a cross section that defines a void. The void has a shape that is configured to change based on a change of pressure difference between a cavity pressure in the cavity and a vessel pressure in the pressure vessel. The enclosed loop has an inner perimeter and an outer perimeter. The second program logic module is for enabling the processor-based system to provide first and second metallization layers on respective inner and outer perimeters of the enclosed loop. The first metallization layer is electrically connected to a portion of the semiconductor substrate that is within the inner perimeter of the enclosed loop. The third program logic module is for enabling the processor-based system to route a first metallization trace from the portion of the semiconductor substrate that is within the inner perimeter of the enclosed loop to a first electrode on a top surface of the semiconductor substrate that is outside an isolation barrier that surrounds the cavity. The third program logic module is further for enabling the processor-based system to route a second metallization trace from the second metallization layer to a second electrode on the top surface of the semiconductor substrate that is outside the isolation barrier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the disclosed technologies.

Figure 11A:
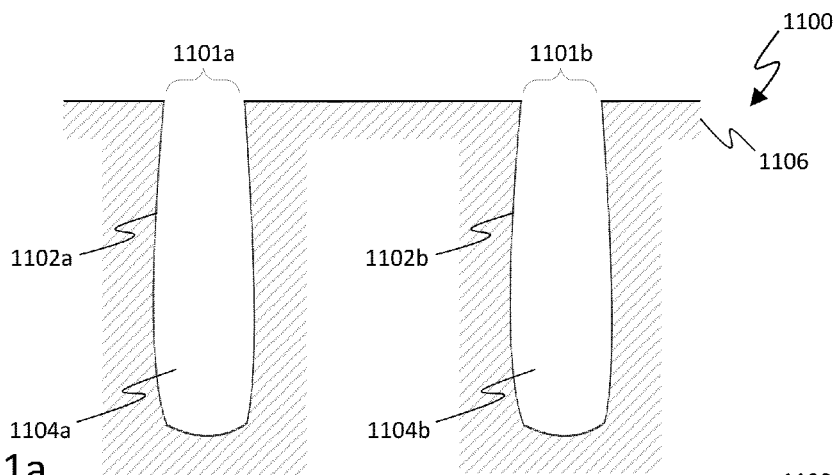
Figure 11B:
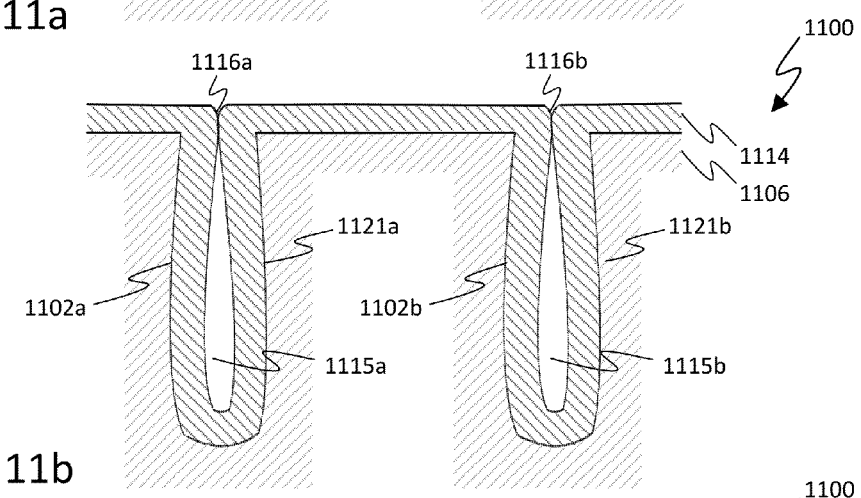
Figure 11C:
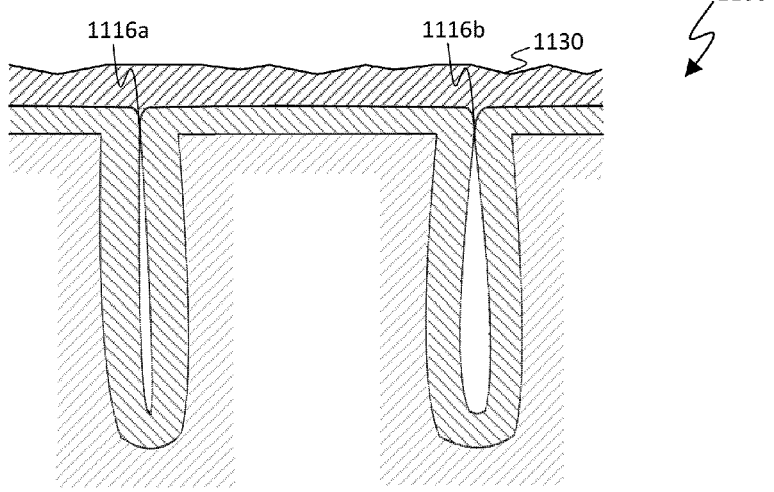
Figure 11D:
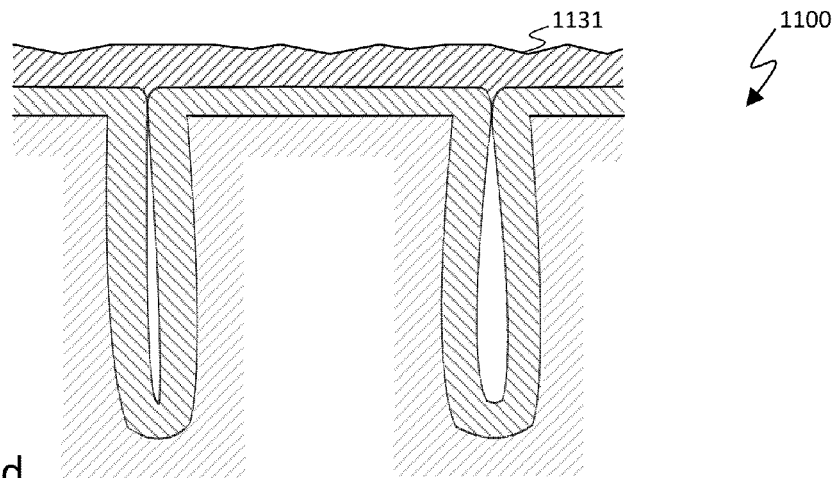
Figure 11E:
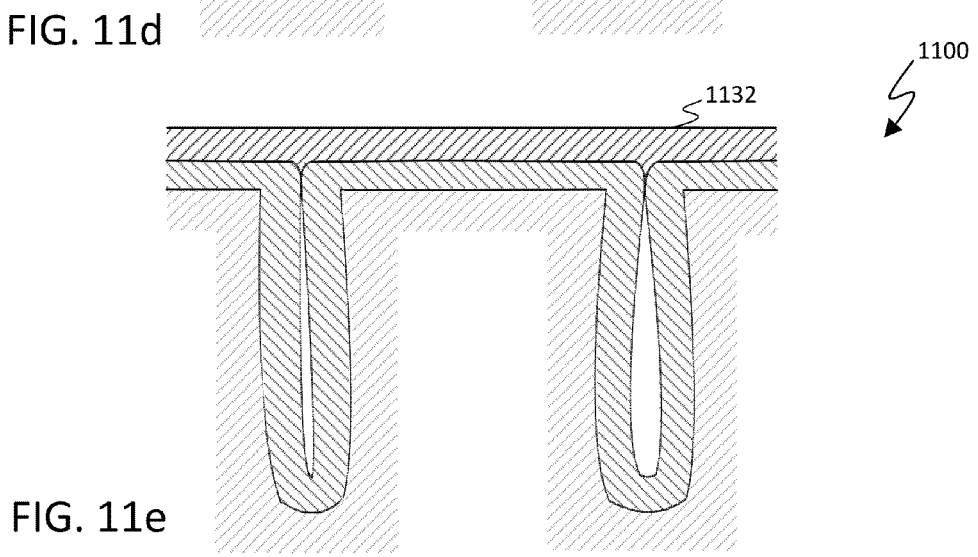
Figure 11F:
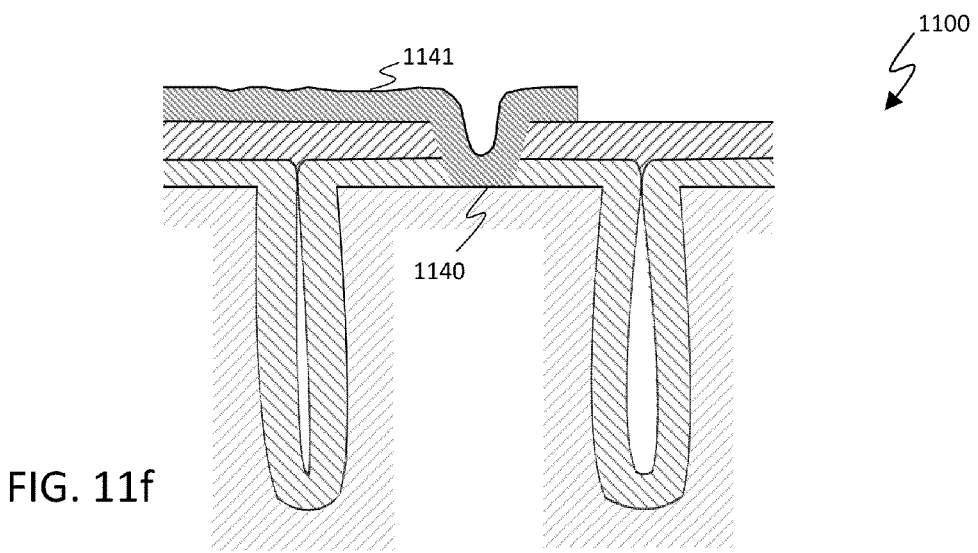
Figure 11G:
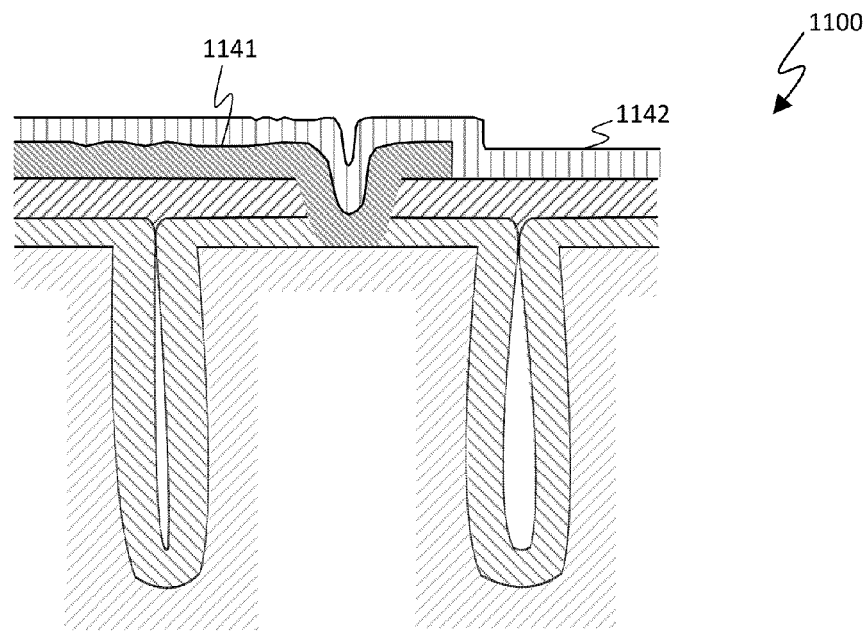
Figure 11H:
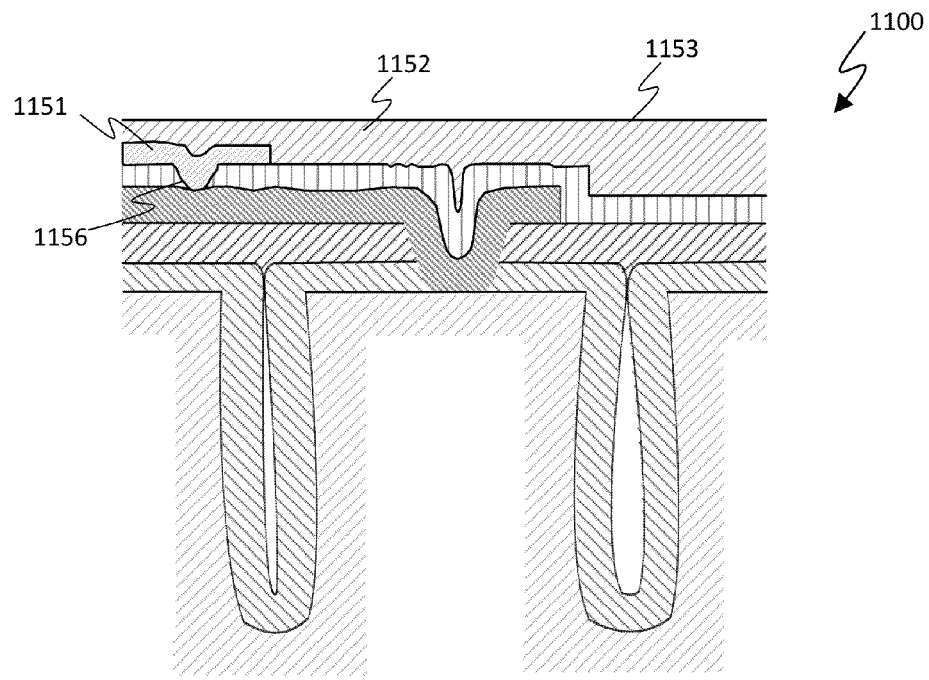
Figure 11I:
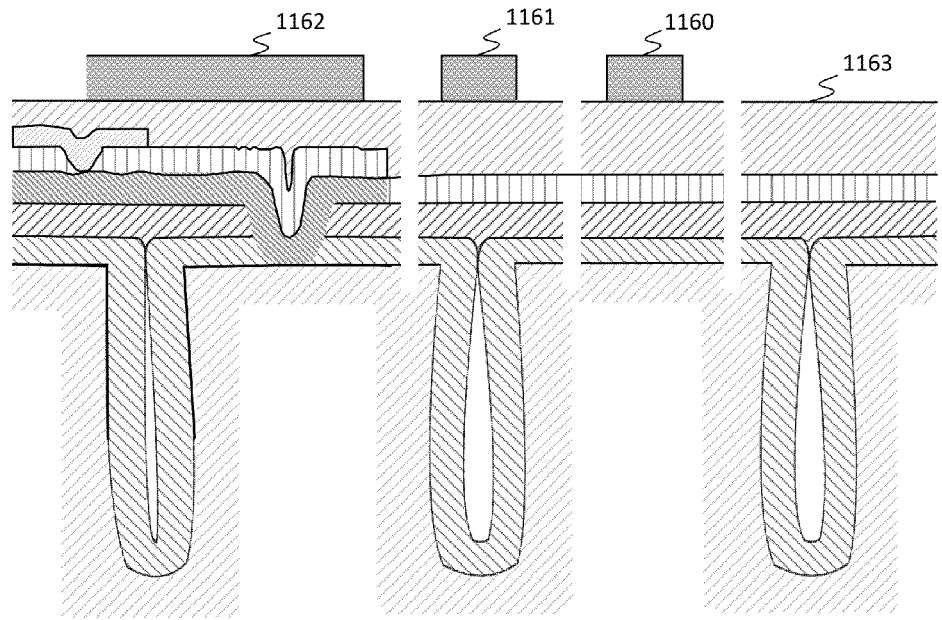
Figure 11J:
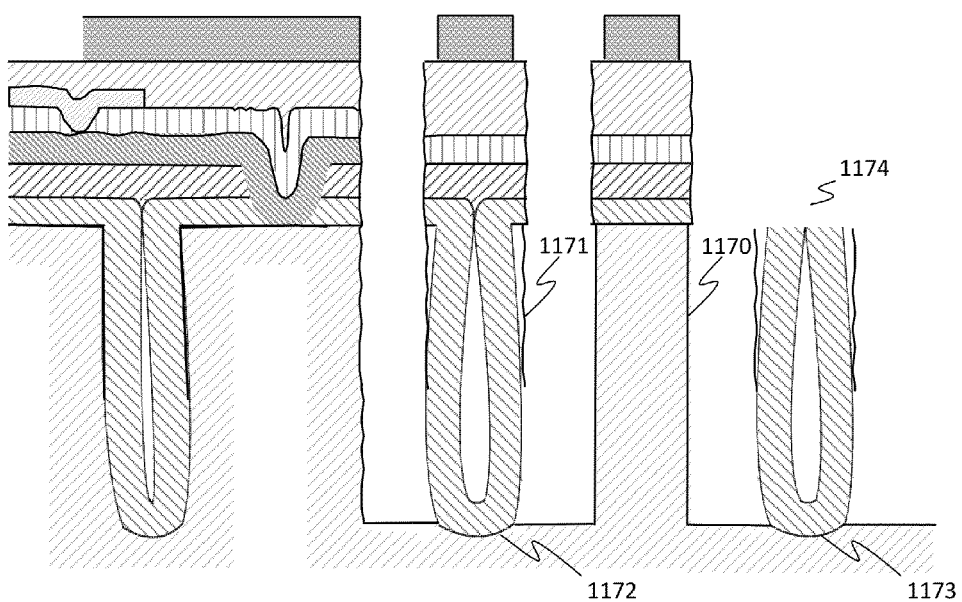
Figure 11K:
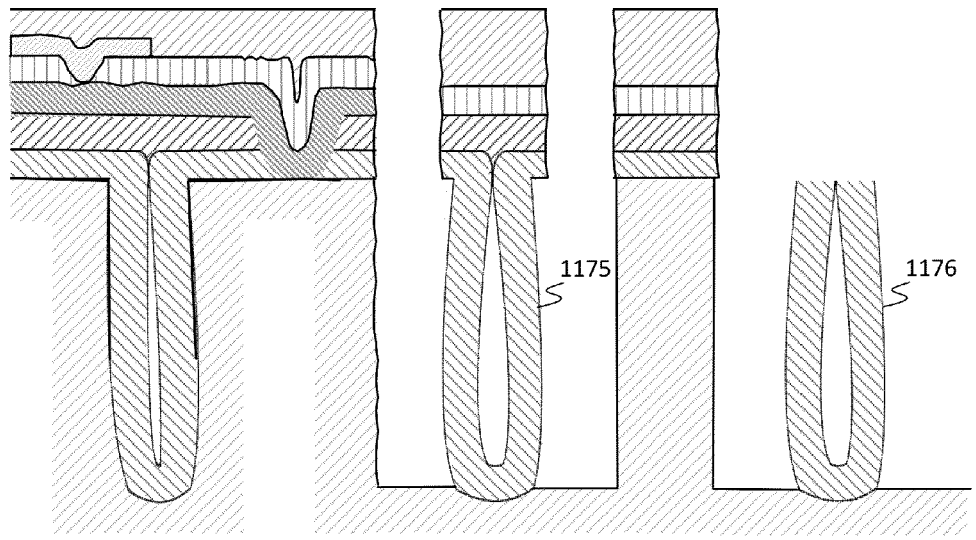
Figure 11L:
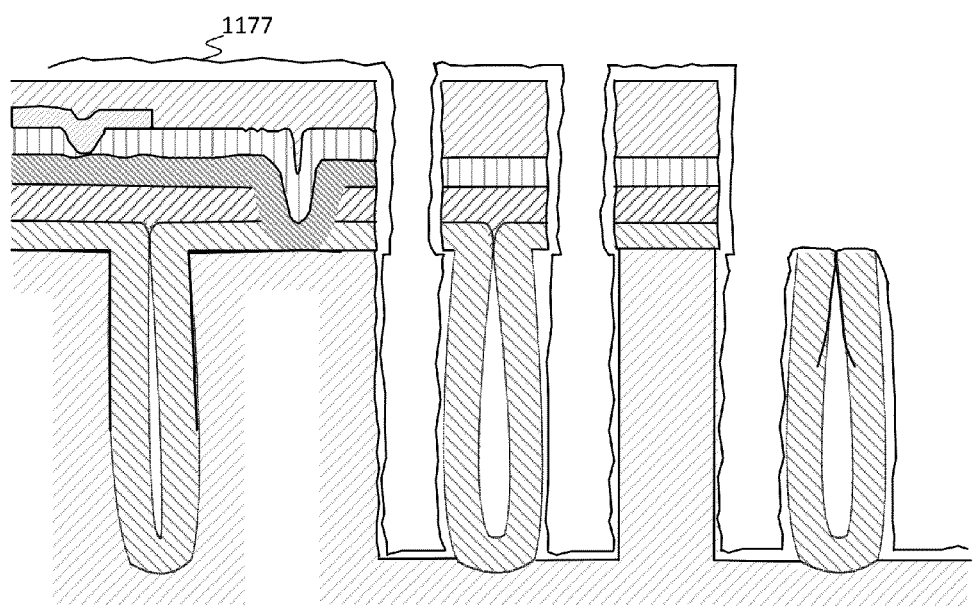
Figure 11M:
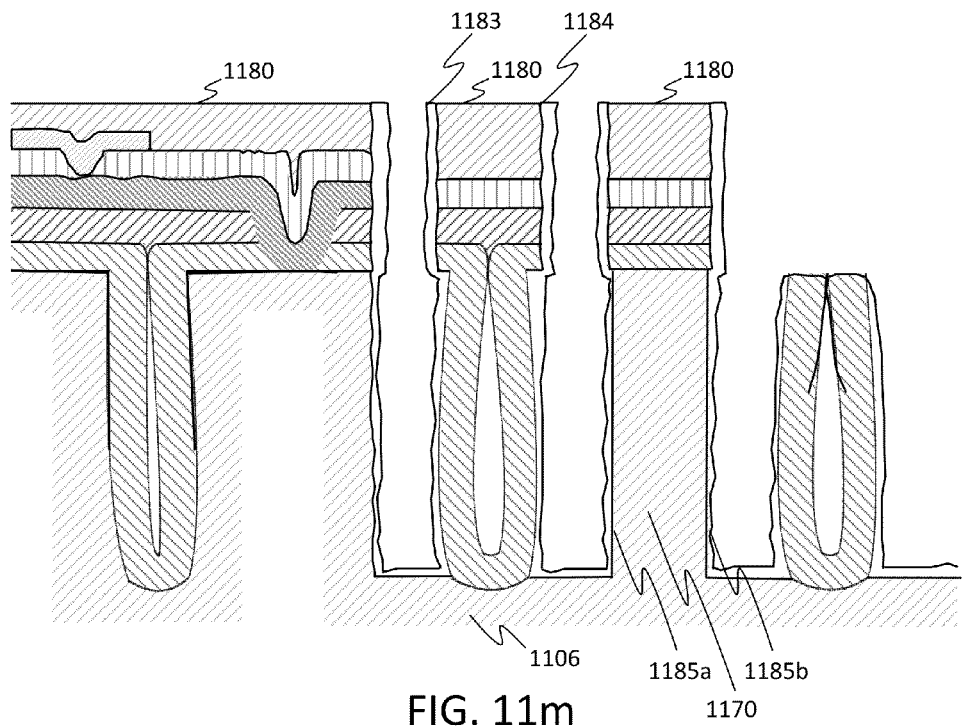
Figure 11N:
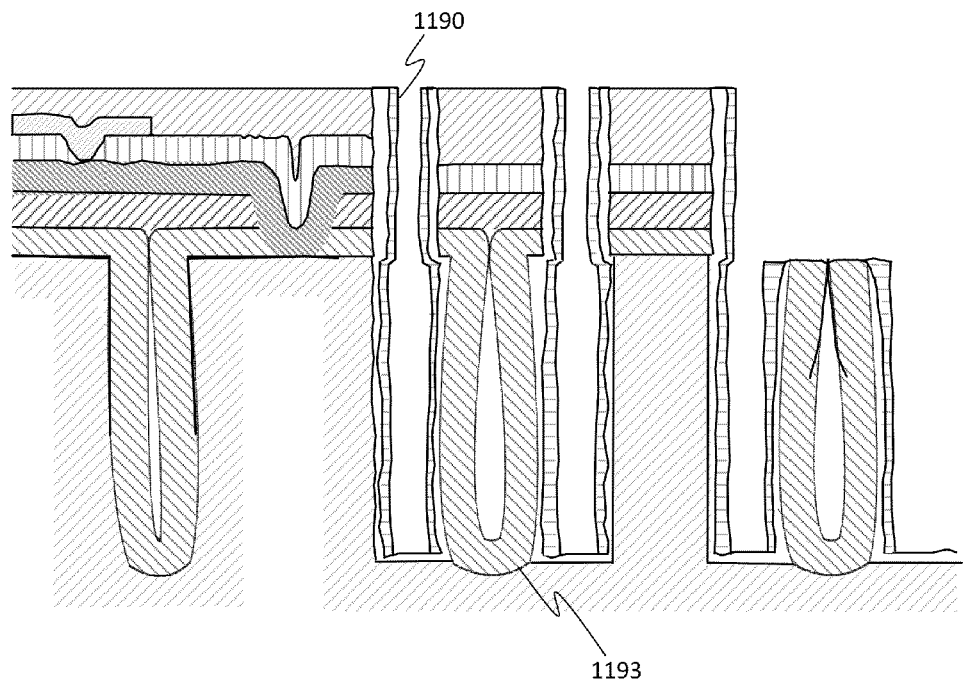
Figure 11O:
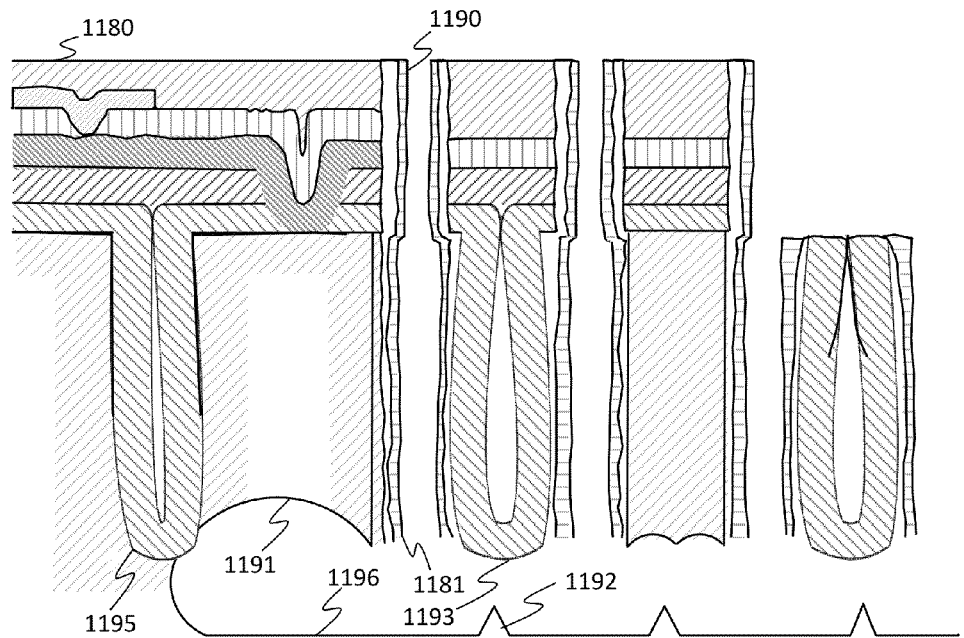
Figure 11P:
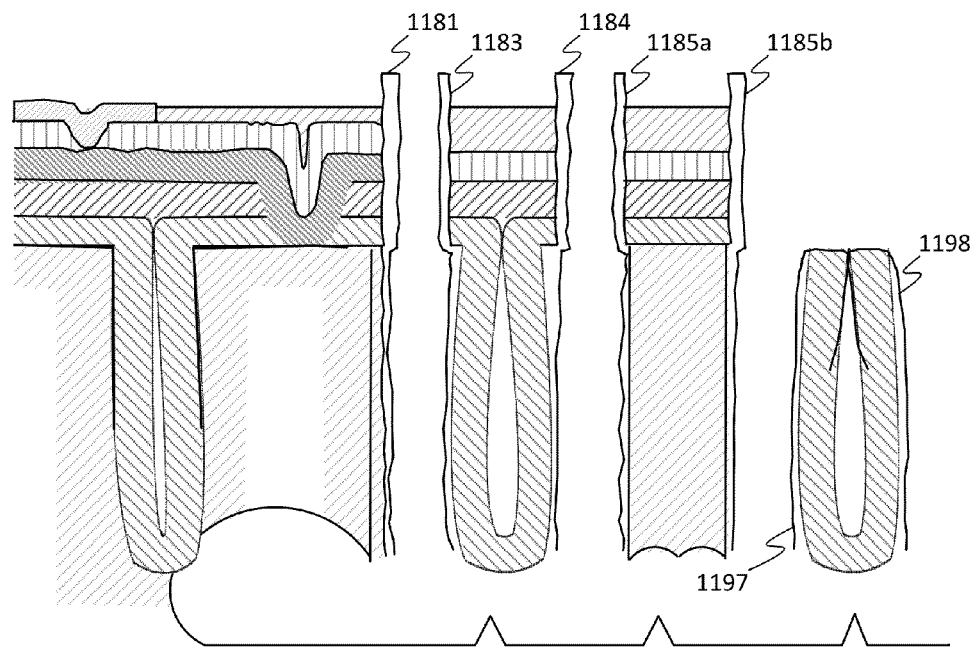

FIG. 11*a*-11*p* show cross-sections of a wafer to illustrate fabrication of a pressure sensor in accordance with embodiments described herein.

Figure 12:
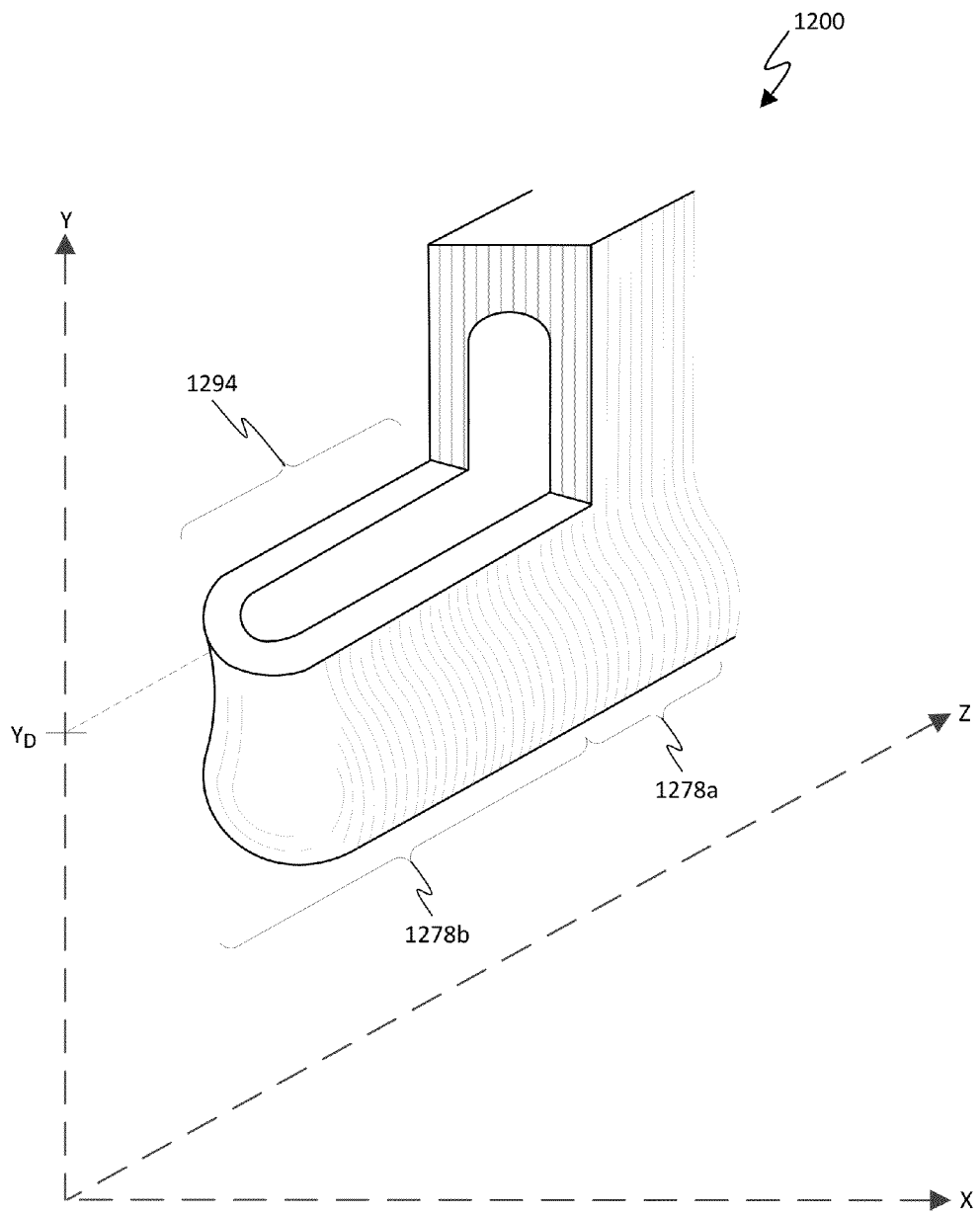

FIG. 12 depicts a pressure vessel having an opening in accordance with an embodiment described herein.

Figure 13:
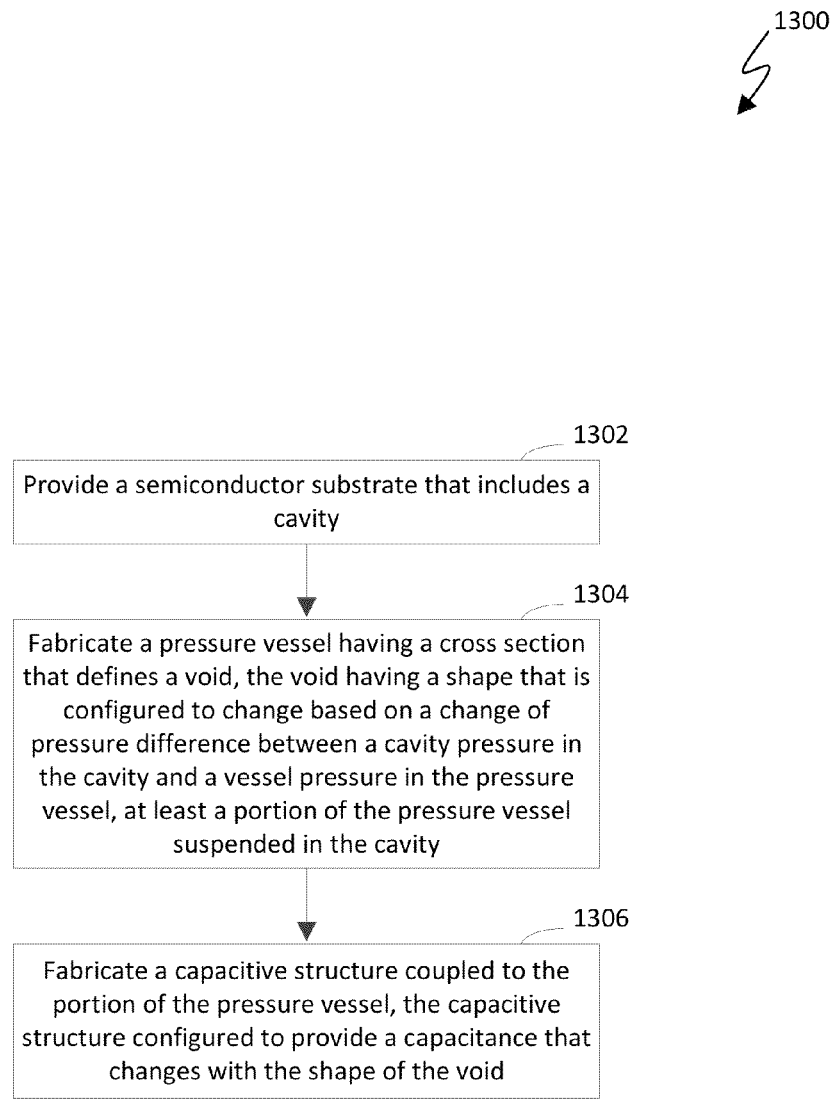
Figure 14:
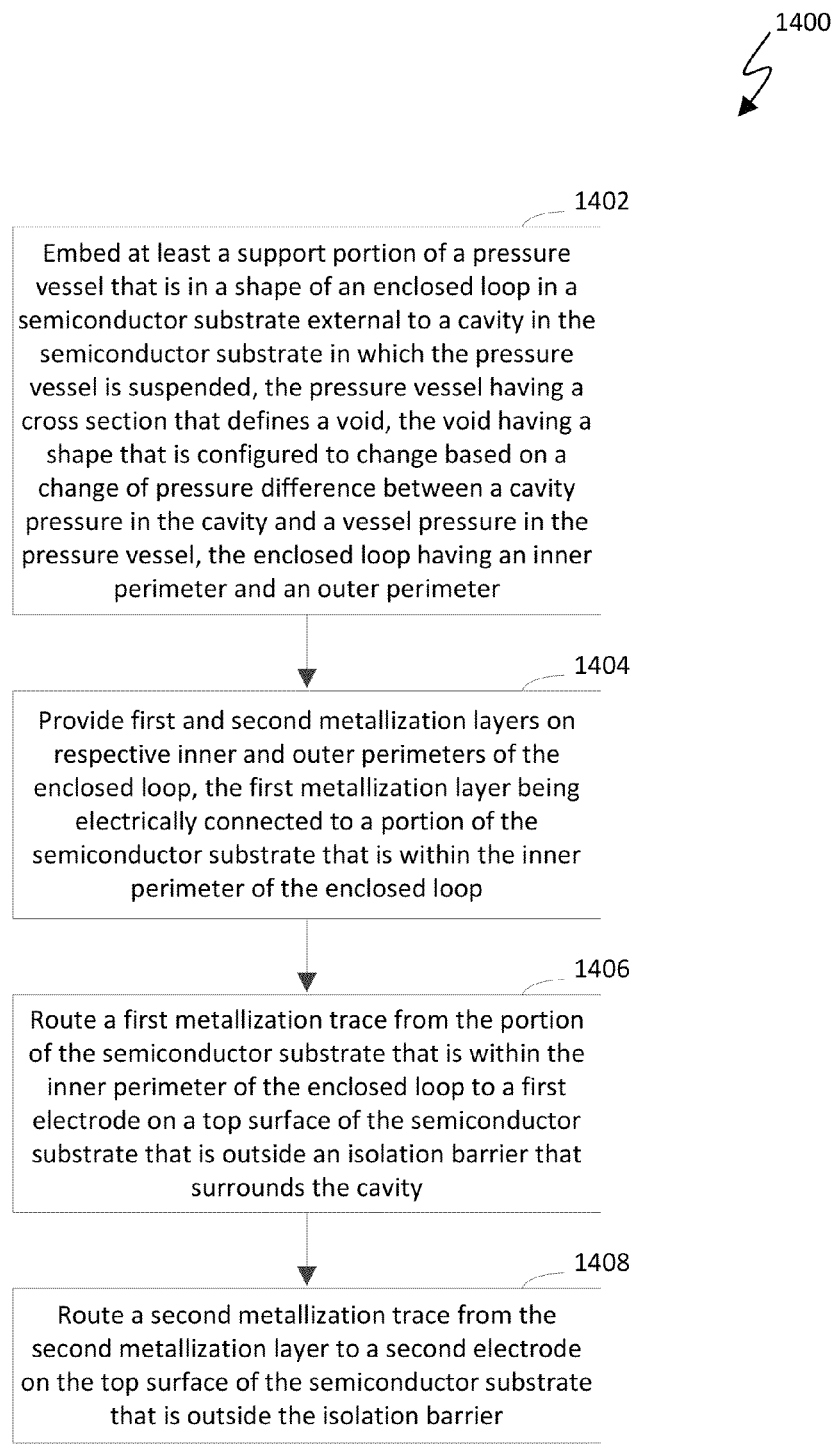

FIGS. 13 and 14 depict flowcharts of example methods for fabricating a pressure sensor in accordance with embodiments described herein.

Figure 15:
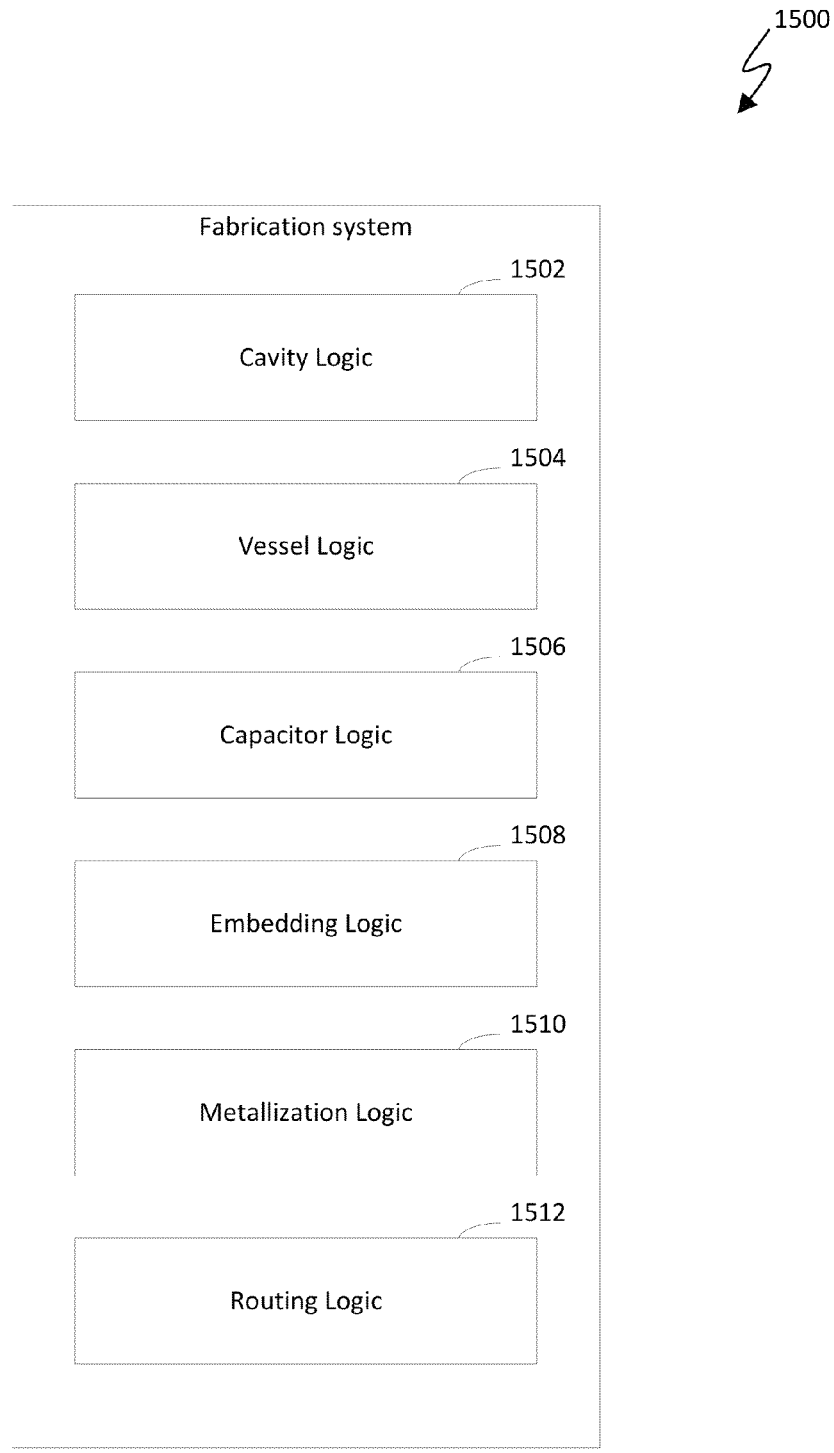

FIG. 15 is a block diagram of an example fabrication system in accordance with an embodiment described herein.

Figure 16:
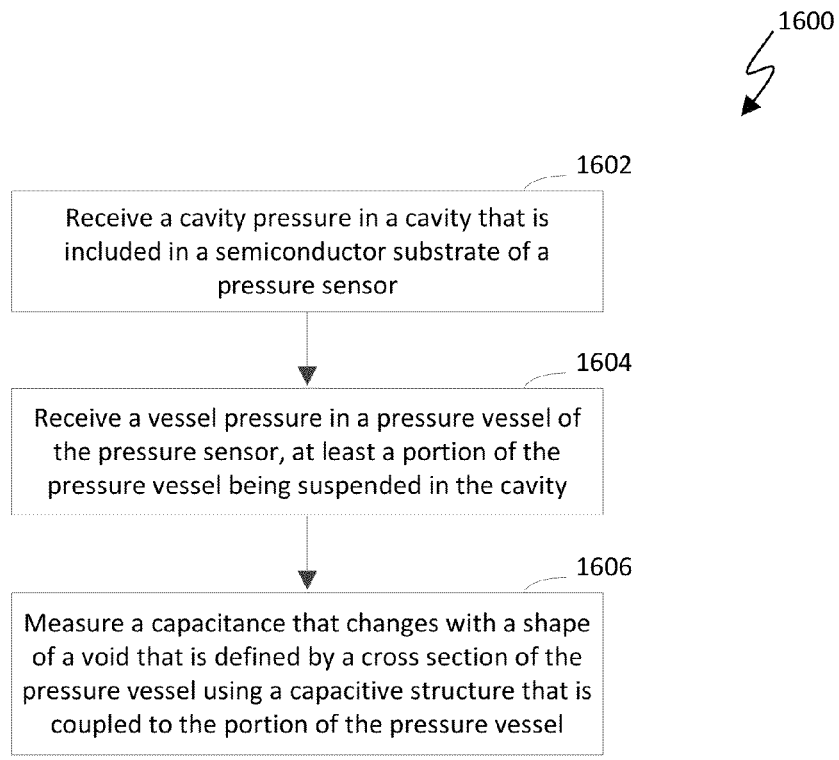

FIG. 16 depicts a flowchart of an example method for using a pressure sensor in accordance with an embodiment described herein.

Figure 17:
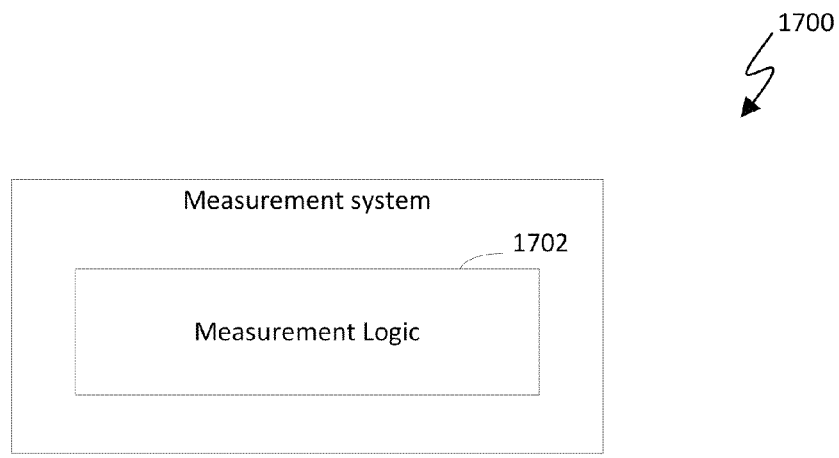

FIG. 17 is a block diagram of an example measurement system in accordance with an embodiment described herein.

Figure 18:
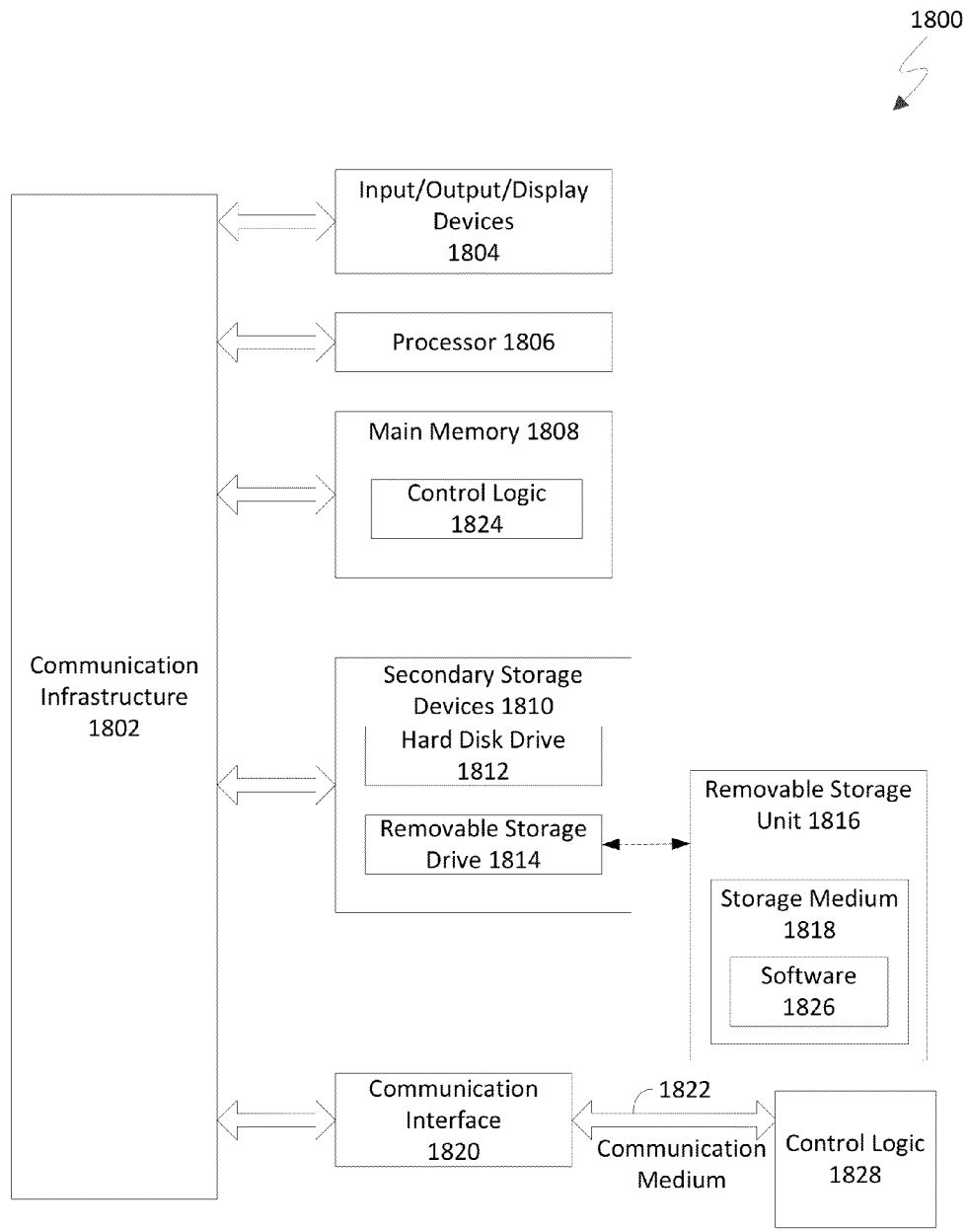

FIG. 18 is a block diagram of a computing system that may be used to implement various embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of performing capacitance-based pressure sensor techniques using pressure vessel(s). A pressure vessel is an object that has a cross section that defines a void. The void has a shape that is configured to change based on a change of pressure difference between a cavity pressure in a cavity in which at least a portion of the pressure vessel is suspended and a vessel pressure in the pressure vessel. In a metaphorical example, the pressure vessel may resemble a tube or hose having side(s) that deform when a pressure is exerted thereon. The pressure vessel may be formed in the shape of an enclosed loop (e.g., along a path that is perpendicular to the cross section), resulting in a looped pressure vessel. For instance, an end of the pressure vessel may be connected to another end of the pressure vessel to form the enclosed loop. In another metaphorical example, a looped pressure vessel may resemble a hula hoop or a tire tube. The examples mentioned above are metaphorical and are provided merely for illustrative purposes. These examples are not intended to be limiting.

Pressure sensors described herein are capacitive-based, meaning that the pressure sensors include capacitors to measure pressure differences. A pressure sensor may include structures that are sculpted out of one piece of single-crystal silicon. Such structures may include the aforementioned capacitors. Sculpting the structures from one piece of single-crystal silicon may provide benefits from a mechanical perspective, for example, because the silicon may include relatively few flaws (e.g., no flaws) and/or the silicon may be a relatively well controlled material. In order to fabricate capacitors having plates that are not shorted together, an isolation technology may be used. For instance, a trench isolation process may be employed in which insulating segments are embedded into a wafer before the structures are sculpted, so that the insulating segments electrically insulate but mechanically couple the pieces of the structures together. Some example techniques for embedding insulating segments into a wafer are described in U.S. Pat. App. Pub. No. 2012/0205752, entitled "Strengthened Micro-Electromechanical System Devices and Methods of Making Thereof," which is incorporated by reference herein in its entirety.

Example techniques described herein have a variety of benefits as compared to conventional techniques for sensing pressure. For instance, the example techniques may be characterized by a relatively low stress/thermal sensitivity. Accordingly, the example techniques may be less affected by external package stress than conventional pressure sensing techniques. In fact, the described techniques may be immune to external package stress. For instance, the example pressure sensors described herein may have a support structure configured to physically support pressure vessel(s) that does not allow external tensions to be transmitted into a sensing area of the pressure sensors. A sensing area of a pressure sensor is defined by a cavity in a semiconductor substrate. Accordingly, the example techniques may be capable of coupling external pressure changes internally to the pressure sensor without coupling temperature-induced external package stress internally to the pressure sensor. For instance, the example techniques may provide a single point of support for each looped pressure vessel in a pressure sensor, which may result in a relatively lower probability of package stress entering the pressure sensor, as compared to the traditional two points of support (e.g., at opposing ends of a membrane) that characterize many conventional pressure sensors. The described pressure sensors may be insensitive to changes of temperature.

The example pressure sensors described herein may be characterized by a relatively low manufacturing cost. For instance, the described pressure sensors may be fabricated based on existing fabricating techniques. The described pressure sensors may be capable of being fabricated using a fabrication process that is similar to or same as a process that is used to fabricate inertial sensors, such as accelerometers and/or gyroscopes. For instance, building pressure sensors on the same wafer as such accelerometers and/or gyroscopes (e.g., simultaneously) may reduce cost of the pressure sensors. The pressure sensors may share a common sensing principle (e.g., variable capacitance-based motion sensing) with accelerometers and/or gyroscopes. Accordingly, a pressure sensor, an accelerometer, and/or gyroscope may share circuitry, such that fabricating them on the same wafer may result in a relatively small incremental cost of the wafer or the devices fabricated thereon.

The example pressure sensors described herein may have a relatively high sensitivity to pressure changes due to a vertical orientation of the pressure vessels therein. The described pressure sensors may utilize vertical capacitor plates (e.g., on either side of a line that is perpendicular to a plane of the wafer from which the pressure sensor is fabricated) as opposed to horizontal capacitor plates. For instance, vertical capacitor plates may be placed on respective vertical walls of a pressure vessel. Accordingly, the described pressure sensors may consume less area of a wafer than conventional pressure sensors. Consuming less area may result in a relatively lower price of the described pressure sensors, as compared to conventional pressure sensors.

Figure 1:
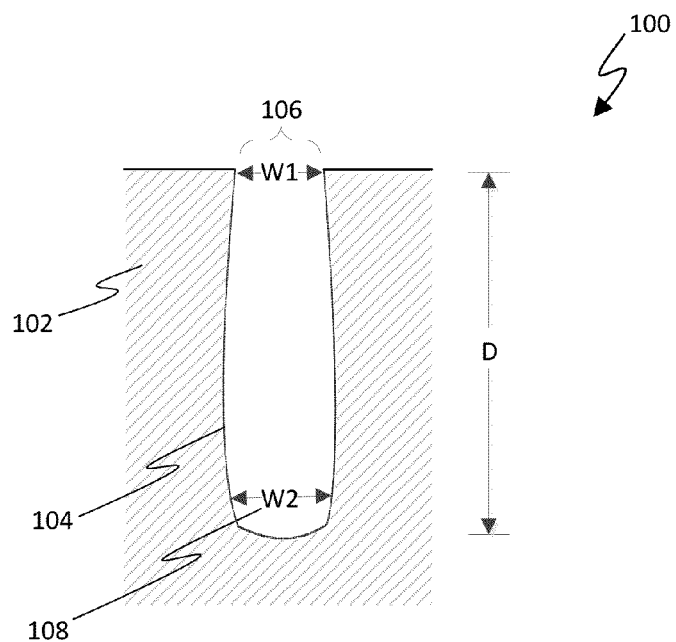
FIGS. 1-3 show cross-sections of a wafer to illustrate fabrication of a pressure vessel in accordance with embodiments described herein.
Figure 2:
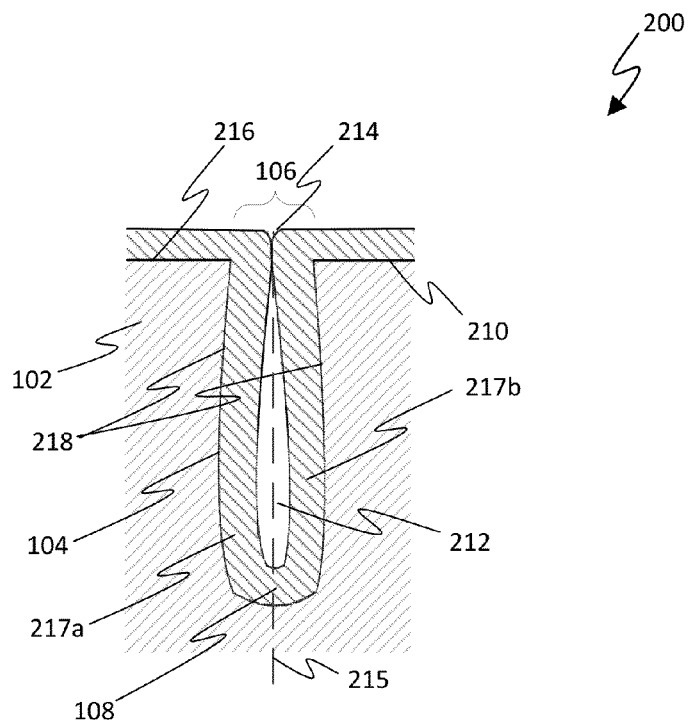
Figure 3:
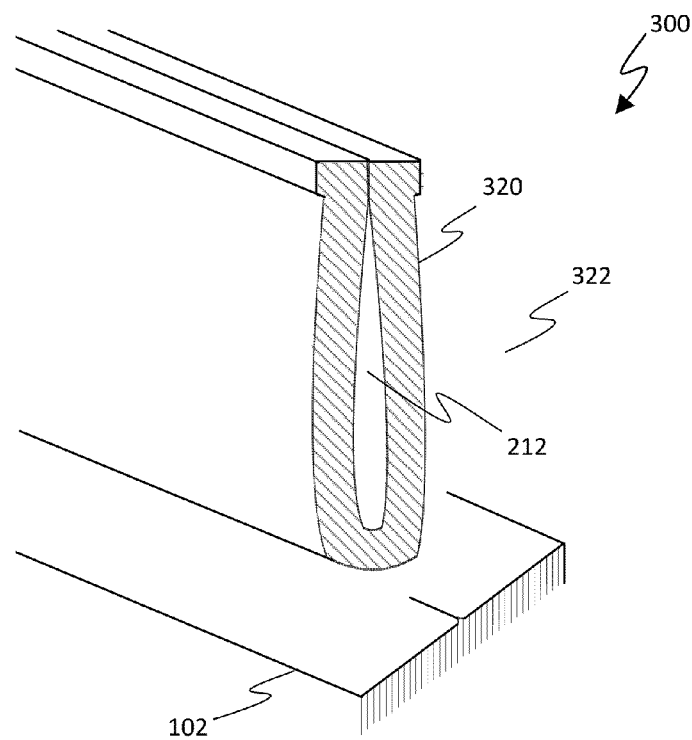

FIGS. 1-3 show cross-sections 100, 200, and 300 of a wafer to illustrate fabrication of a pressure vessel in accordance with embodiments described herein. The fabrication may be based on a process used to construct micromechanical devices as described in U.S. Pat. No. 6,239,473, entitled "Trench Isolation for Micromechanical Devices," though the scope of the example embodiments is not limited in this respect. A portion of the process, which is described in U.S. Pat. No. 6,239,473, is depicted in FIGS. 1-3. U.S. Pat. No. 6,239,473 is incorporated by reference herein in its entirety.

As shown in FIG. 1, a trench 104 is formed in a wafer 102. Wafer 102 may include any suitable type of material, including but not limited to silicon, gallium arsenide, etc. Trench 104 may be formed by deep reactive ion etching using high etch rate, high selectivity etching, though the scope of the example embodiments is not limited in this respect. Trench 104 may be etched in a high density plasma using an SF6 gas mixture, for example. One technique for etching a trench in a high density plasma using an SF6 gas mixture is described in U.S. Pat. No. 5,501,893, entitled "Method of Anisotropically Etching Silicon," which is incorporated by reference herein in its entirety.

The etch may be controlled so that a profile of trench 104 is reentrant, or tapered, with an opening 106 of trench 104 having a width, W1, that is narrower than a width, W2, of a bottom 108 of trench 104. Such tapering may increase a likelihood that electrical isolation is achieved in subsequent processing. Profile tapering can be achieved in reactive ion etching by tuning the degree of passivation, or by varying parameter(s) (e.g., power, gas flows, and/or pressure) of a discharge during the etching. Because trench 104 is to be at least partially filled with a dielectric, the width, W1, of opening 106 may be chosen to be relatively small (e.g., less than 2 microns (μm)). A depth, D, of trench 104 may be in a range of 10-50 μm. The width, W2, of the bottom 108 of trench 104 may be in a range of 2-3 μm. The example width and depth measurements mentioned above are provided for illustrative purposes and are not intended to be limiting. It will be recognized that any suitable width and depth values may be used.

Etching the trench 104 may include alternating etch steps (SF 6 and argon mixture) with passivation steps (Freon with argon) in an inductively coupled plasma (ICP) to achieve etch rates in excess of 2 μm/min at high selectivity to photoresist (>50:1) and oxide (>100:1). The power and duration of the etch cycles may be increased as trench 104 deepens to achieve the tapered profile. Although the geometry of trench 104 is shown to be reentrant, arbitrary trench profiles can be accommodated with adjustments in microstructure processing. Adequate isolation results can be achieved with any of a variety of known trench etch chemistries.

As shown in FIG. 2, wafer 102 is oxidized. By oxidizing the wafer 102, a silicon dioxide layer 210 (or other suitable insulating dielectric material) is provided on a top surface 216 of wafer 102 and along sidewalls 218 and bottom 108 of trench 104. The thickness of silicon dioxide layer 210 may be in excess of 1 μm, for example. The provision of silicon dioxide layer 210 may be accomplished using a chemical vapor deposition (CVD) technique or with oxidation of silicon at relatively high temperatures. In thermal oxidation, wafer 102 may be exposed to an oxygen rich environment at temperatures in a range of 900-1150° C. In this example, the oxidation process consumes silicon surfaces to form silicon dioxide layer 210. It will be recognized that the wafer may be formed from any suitable type of semiconductor material, and the surfaces thereof may be consumed to form an oxide layer other than silicon dioxide. The resulting volumetric expansion from this process causes sidewalls 218 of trench 104 to encroach upon each other, and silicon dioxide layer 210 seals at location 214, thereby closing opening 106.

Because the width, W1, of the opening 106 of trench 104 is narrower than the width, W2, of the bottom 108 of trench 104, a void 212 is formed. The void 212 normally may be undesirable in manufacturing; however, in the embodiments described herein, the void 212 is used as the basis of the pressure sensor design.

In an example embodiment, oxidizing the wafer 102 causes first and second oxide walls 217a and 217b to be formed on opposing sides of an axis 215, which is perpendicular to top surface 216 of wafer 102, to define the void 212 between first and second oxide walls 217a and 217b.

As shown in FIG. 3, through subsequent patterning and release steps, silicon dioxide layer 210 is released from contact with wafer 102 to provide a pressure vessel 320. Differences between a pressure in the void 212 and a pressure in surrounding area 322 cause pressure vessel 320 to bulge or compress. Accordingly, such differences cause a shape of void 212 to change.

Figure 4:
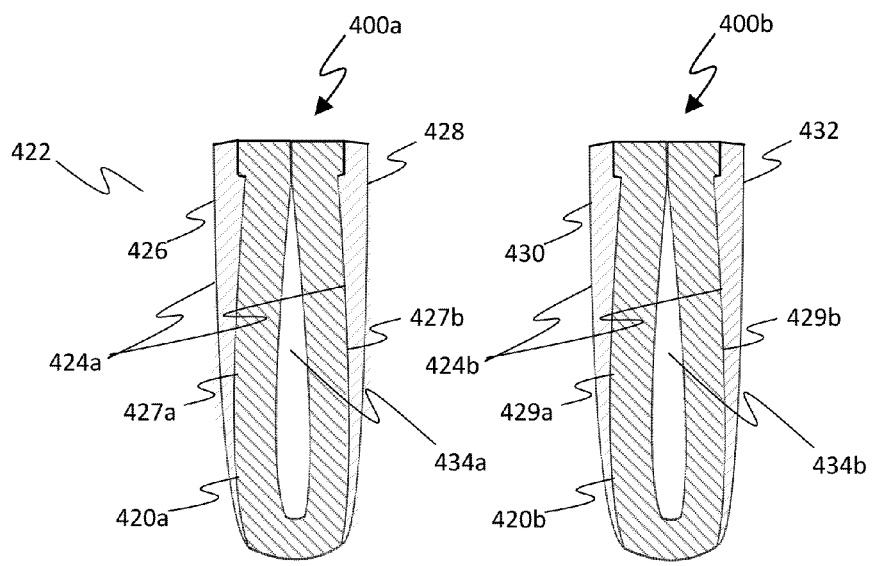
FIG. 4 shows two sense elements in accordance with an embodiment described herein.

FIG. 4 shows two sense elements 400a and 400b in accordance with an embodiment described herein. Sense element 400a includes a pressure vessel 420a and a corresponding capacitive structure 424a. Sense element 400b includes a pressure vessel 420b and a corresponding capacitive structure 424b. In particular, the sides of pressure vessel 420a are metallized to provide capacitive structure 424a, and the sides of pressure vessel 420b are metallized to provide capacitive structure 424b.

Capacitive structure 424a includes metal layers 426 and 428, which are coupled to respective opposing walls 427a and 427b of pressure vessel 420a and form capacitor plates that are used in sensing pressure by sensing element 400a. Capacitive structure 424b includes metal layers 430 and 432, which are coupled to respective opposing walls 429a and 429b of pressure vessel 420b and form capacitor plates that are used in sensing pressure by sensing element 400b.

Pressure 422 is an outside pressure, which is external to sensing elements 400a and 400b. Pressures 434a and 434b are interior pressures of sense elements 400a and 400b, respectively. As a difference between pressure 422 and pressure 434a changes, a shape of pressure vessel 420a changes, which causes a separation between metal layers (i.e., capacitor plates) 426 and 428 to change, which causes a change of capacitance between metal layers 426 and 428. For example, as pressure 422 decreases relative to pressure 434*a* (or pressure 434*a* increases relative to pressure 422), pressure vessel 420*a* bulges, causing a distance between walls 427*a* and 427*b* to increase, which causes a distance between metal layers 426 and 428 to increase, which causes the capacitance between metal layers 426 and 428 to decrease. In another example, as pressure 422 increases relative to pressure 434*a* (or pressure 434*a* decreases relative to pressure 422), pressure vessel 420*a* compresses, causing the distance between walls 427*a* and 427*b* to decrease, which causes the distance between metal layers 426 and 428 to decrease, which causes the capacitance between metal layers 426 and 428 to increase.

As a difference between pressure 422 and pressure 434*b* changes, a shape of pressure vessel 420*b* changes, which causes a separation between metal layers (i.e., capacitor plates) 430 and 432 to change, which causes a change of capacitance between metal layers 430 and 432. For example, as pressure 422 decreases relative to pressure 434*b* (or pressure 434*b* increases relative to pressure 422), pressure vessel 420*b* may bulge, causing a distance between walls 429*a* and 429*b* to increase, which may cause a distance between metal layers 430 and 432 to increase, which may cause the capacitance between metal layers 430 and 432 to decrease. In another example, as pressure 422 increases relative to pressure 434*b* (or pressure 434*b* decreases relative to pressure 422), pressure vessel 420*b* may compress, causing the distance between walls 429*a* and 429*b* to decrease, which may cause the distance between metal layers 430 and 432 to decrease, which may cause the capacitance between metal layers 430 and 432 increase.

Example embodiments described herein utilize such changes of capacitance to indicate the corresponding pressure differences with regard to sensing elements, such as sensing elements 400*a* and 400*b*. For example, the pressure differences may indicate motion of the sensing elements. In accordance with this example, a relatively greater pressure difference may correspond to a relatively greater motion, and a relatively lesser pressure difference may correspond to a relatively lesser motion.

In an example embodiment, sensing elements 400*a* and 400*b* are used in combination to measure a pressure difference. For example, as shown in FIG. 4, pressure 422 is the same for both sensing elements 400*a* and 400*b*. In accordance with this example, pressure vessel 420*a* bulges or compresses with a change of pressure 434*a*, which changes a distance between metal layers 426 and 428, resulting in a change of the capacitance between metal layers 426 and 428. In further accordance with this example, the capacitance between metal layers 430 and 432 in sensing element 400*b* may serve as a reference with regard to the capacitance between metal layers 426 and 428. For instance, the interior pressure 434*b* of sensing element 400*b* may be set equal to pressure 422 to serve as a reference pressure.

In another example, sensing elements 400*a* and 400*b* may be configured such that the outside pressure of sensing element 400*a* is different from the outside pressure of sensing element 400*b*. In such a configuration, the outside pressure of sensing element 400*a* and the interior pressure 434*b* of sensing element 400*b* may be the same, and the outside pressure of sensing element 400*b* and the interior pressure 434*a* of sensing element 400*a* may be the same. In accordance with this example, pressure vessel 420*a* may bulge as pressure vessel 400*b* compresses, and pressure vessel 420*a* may compress as pressure vessel 400*b* bulges, such that a differential capacitance may be measured between sensing element 400*a* and sensing element 400*b*. Differential capacitance measurements are discussed in further detail below, primarily with regard to FIG. 10.

Figure 5:
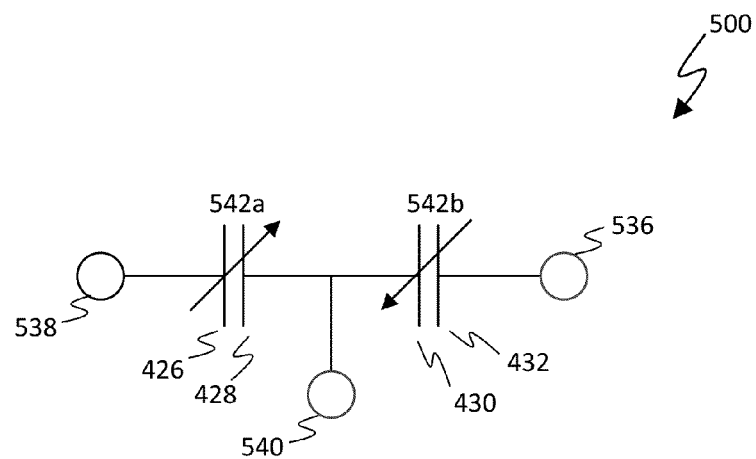
FIG. 5 is a schematic of a capacitance measurement circuit that corresponds to the two sense elements shown in FIG. 4 in accordance with an embodiment described herein.

FIG. 5 is a schematic of a capacitance measurement circuit 500 that corresponds to the two sense elements 400*a* and 400*b* shown in FIG. 4 in accordance with an embodiment described herein. It will be recognized that a change of capacitance can be measured using capacitance measurement circuit 500. As shown in FIG. 5, sense element 400*a* is represented schematically by capacitor 542*a*, which is shown to have capacitor plates 426 and 428. Sense element 400*b* is represented schematically by capacitor 542*b*, which is shown to have capacitor plates 430 and 432. Capacitor 542*a* is coupled between nodes 538 and 540. Capacitor plate 426 is coupled to node 538, and capacitor plate 428 is coupled to node 540. Capacitor 542*b* is coupled between nodes 540 and 536. Capacitor plate 430 is coupled to node 540, and capacitor plate 432 is coupled to node 536.

By connecting the pressures 422, 434*a*, and 434*b* in various ways to environmental regions external to the pressure sensor to be sensed or to reference cavities, which will be discussed in further detail below, a differential or single-ended pressure measurement system may be achieved. For instance, a difference between a capacitance of capacitor 542*a* and a capacitance of capacitor 542*b* may be measured by connecting node 540 to a charge amplifier, which converts charge to voltage. Carriers, which are configured as square waves, may be applied to nodes 538 and 536, such that the square wave at node 538 is initially in a high state and the square wave at node 356 is initially in a low state. The carrier applied to node 538 and the carrier applied to node 536 have opposite phase. When a measurement is to be performed, the carriers are "swiped", meaning that the square wave at node 538 is transitioned from the high state to the low state and the square wave at node 536 is transitioned from the low state to the high state. Swiping the carriers changes the voltage difference across the capacitors 542*a* and 542*b*. If capacitors 542*a* and 542*b* are perfectly matched, no net charge goes through node 540, though it will be recognized that capacitors 542*a* and 542*b* need not necessarily be perfectly matched. Once the charge is integrated, the resulting voltage is proportional to the difference between the capacitance of capacitor 542*a* and the capacitance of capacitor 542*b*.

Figure 6:
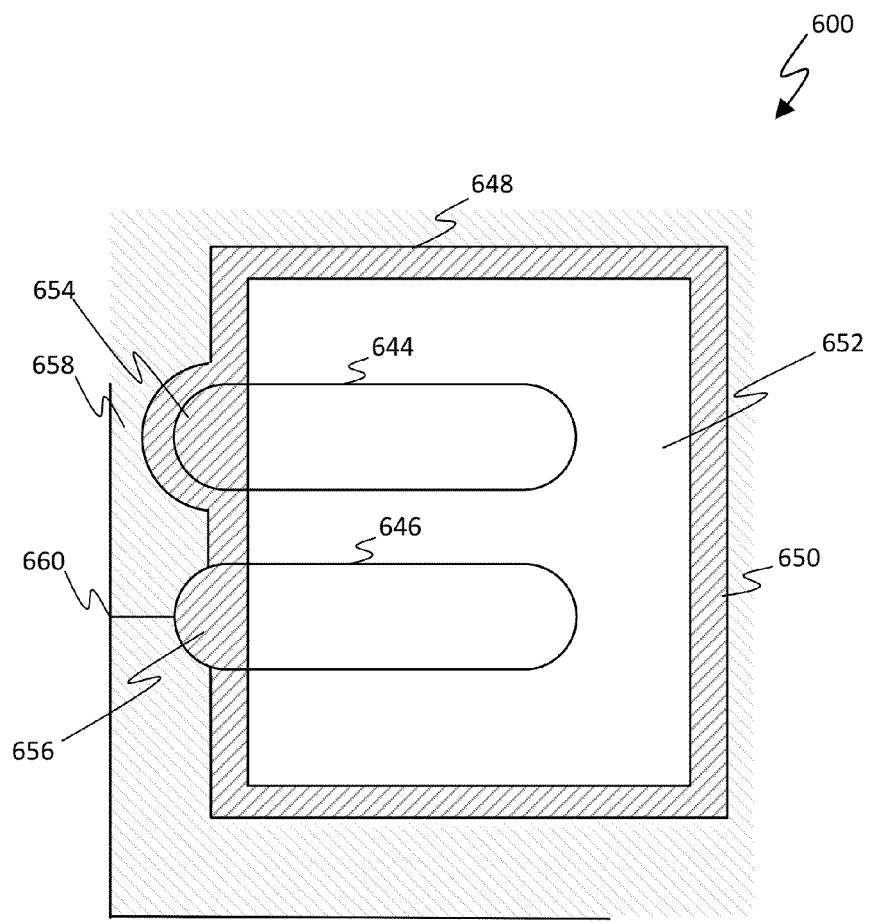
FIG. 6 is a simplified top view of a pressure sensor having two looped pressure vessels in accordance with an embodiment described herein.

FIG. 6 is a simplified top view of a pressure sensor 600 having two looped pressure vessels 644 and 646 in accordance with an embodiment described herein. As shown in FIG. 6, looped pressure vessels 644 and 646 are depicted using respective lines for simplicity. It will be recognized that each line represents a complete pressure vessel, such as pressure vessel 420*a* or 420*b* of FIG. 4. A looped pressure vessel differs from a linear pressure vessel in that a looped pressure vessel has an inside and an outside with respect to the loop; whereas, a linear pressure vessel has a left side and a right side. The relevance is evidenced in the micromechanical fabrication. For instance, patterning conductive films down a sidewall can be notoriously difficult to do well in production.

Looped pressure vessels 644 and 646 are mostly interior to a cavity 652, which is etched out of a wafer substrate 658, for illustrative purposes and are not intended to be limiting. It will be recognized that any suitable portions of respective looped pressure vessels 644 and 646 may be interior to cavity 652. As oriented in FIG. 6, the left ends of looped pressure vessels 644 and 646 are embedded in wafer substrate 658, and remaining silicon portions 654 and 656 are interior to the respective loops that form looped pressure vessels 644 and 646. Ultimately, remaining silicon portions 654 and 656 will serve to connect to the sidewall capacitor plates that form the variable capacitors, e.g. capacitor plates 426 and 432, on looped pressure vessels 644 and 646, as discussed in greater detail below with reference to FIG. 7.

FIG. 6 includes three silicon segments 650, 654, and 656, which correspond to the three nodes 540, 536, and 538, respectively, which are shown in FIG. 5. Silicon segment 650 is referred to as an interior portion of wafer 658, which is electrically isolated from the rest of wafer 658 via an isolation ring (a.k.a. bounding isolation trench) 648. Isolation ring 648 encompasses both of looped pressure vessels 644 and 646 and allows an exit for a vessel pressure port 660. Vessel pressure port 660 is an opening in a pressure vessel that exposes a pressure in looped pressure vessel 646 to an environment that is external to looped pressure vessel 646. A pressure port is an opening that exposes one or more environments to one or more other environments. Accordingly, vessel pressure port 660 constitutes a pressure port. A vessel pressure port is an opening in a pressure vessel that exposes one or more environments to one or more other environments. Accordingly, vessel pressure port 660 also constitutes a vessel pressure port.

One way of allowing the exit for vessel pressure port 660 is to directly connect isolation ring 648 to looped pressure vessel 646 as shown in FIG. 6. Connecting isolation ring 648 to looped pressure vessel 644 as well would equalize the pressures in looped pressure vessels 644 and 646 and therefore render pressure sensor 600 inoperable. For this reason, isolation ring 648 is routed around looped pressure vessel 644.

Figure 7:
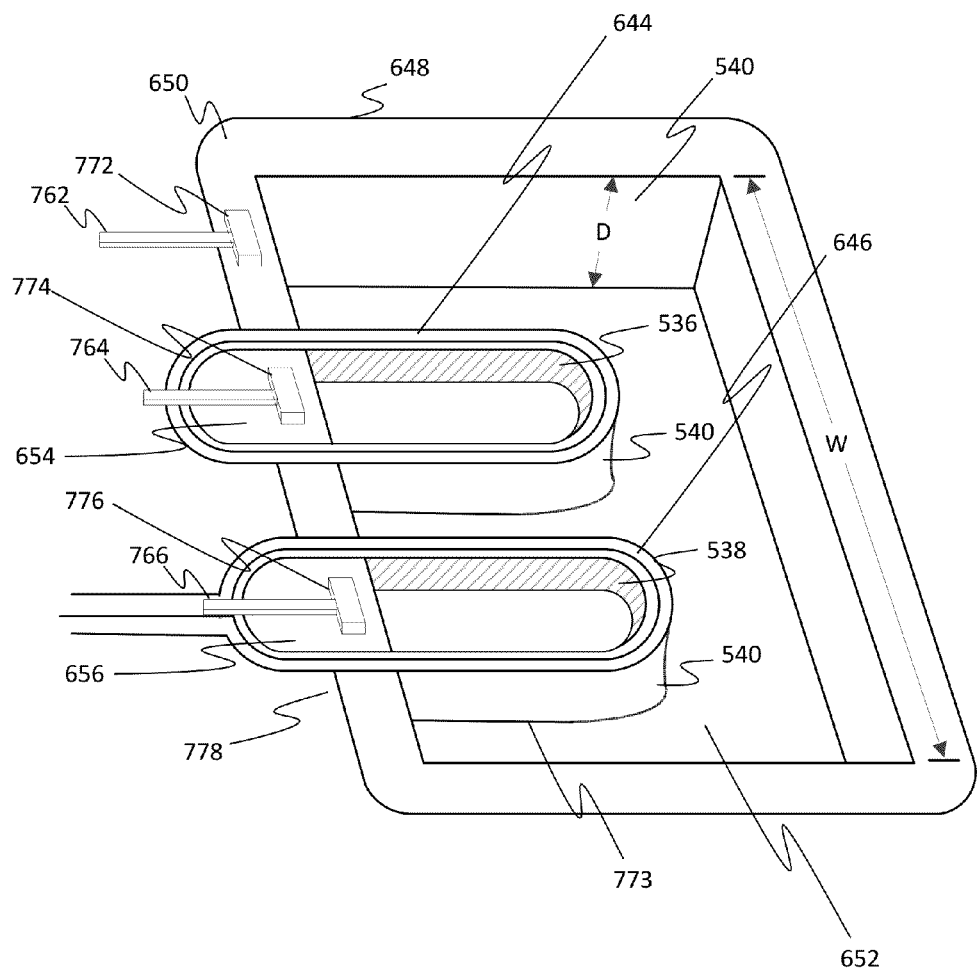
FIG. 7 is a more detailed top view of the pressure sensor shown in FIG. 6 in accordance with an embodiment described herein.

FIG. 7 is a more detailed top view of pressure sensor 600 shown in FIG. 6 in accordance with an embodiment described herein. Recall from FIG. 5 that capacitor plate 426 is coupled to node 538; capacitor plates 428 and 430 are coupled to node 540; and capacitor plate 432 is coupled to node 536. Capacitor plates 426, 428, 430, and 432 reside on the sidewalls of looped pressure vessels 644 and 646. In particular, capacitor plate 426 resides on an inner side wall (e.g., on a portion of the inner side wall) of looped pressure vessel 646, which corresponds to an inner perimeter of looped pressure vessel 646. Capacitor plate 428 resides on an outer side wall (e.g., on a portion of the outer side wall) of looped pressure vessel 646, which corresponds to an outer perimeter of looped pressure vessel 646. Capacitor plate 432 resides on an inner side wall (e.g., on a portion of the inner side wall) of looped pressure vessel 644, which corresponds to an inner perimeter of looped pressure vessel 644. Capacitor plate 432 resides on an outer side wall (e.g., on a portion of the outer side wall) of looped pressure vessel 644, which corresponds to an outer perimeter of looped pressure vessel 644. The inner and outer side walls of looped pressure vessels 644 and 646 need not necessarily be flat. The inner and outer side walls may be curved or any other suitable shape.

In order to electrically connect to the capacitor plates 426, 428, 430, and 432, electrical signals travel from metal to silicon and back to metal again. One example starts with the interior of looped pressure vessel 646, specifically, node 538. Node 538 wraps around the interior of looped pressure vessel 646 and electrically connects to silicon segment 656. Silicon segment 656 connects to electrical trace 766 using a via 776 through a dielectric layer 778 that will be described in greater detail below with regard to the fabrication processing steps illustrated in FIGS. 11a-11p. Electrical trace 766 may electrically connect silicon segment 656, which is interior to the inner perimeter of looped pressure vessel 646, to an element that is external to the outer perimeter of looped pressure vessel 646.

Similarly, node 536 connects to silicon segment 654 and up to an electrical trace 764 through via 774. Electrical trace 764 may electrically connect silicon segment 654, which is interior to the inner perimeter of looped pressure vessel 644, to an element that is external to the outer perimeter of looped pressure vessel 644.

Node 540 is formed by electrically connecting silicon segment 650, which extends between a perimeter of isolation ring 648 and a perimeter of cavity 652, to metallization 773, which is provided along the perimeter of cavity 652 and along the outer perimeters of respective looped pressure vessels 644 and 646. Metallization 773 may have a depth of approximately 50 µm and a width of approximately 1 mm, though the scope of the example embodiments is not limited in this respect. It will be recognized that metallization 773 may have any suitable depth and width. Following node 540 around the interior of isolation ring 648 clockwise, node 540 wraps around the exteriors of respective looped pressure vessels 644 and 646. As shown in FIG. 7, metallization 773 in cavity 652 connects to silicon segment 650 and up to electrical trace 762 though via 772.

Cavity 652 may have a depth, D, of approximately 1 millimeter (mm) and a width, W, of approximately 2 mm, though the scope of the example embodiments is not limited in this respect. It will be recognized that cavity 652 may have any suitable depth and width.

In FIGS. 6 and 7, two looped pressure vessels 644 and 646 are shown to be suspended in cavity 652 for illustrative purposes and are not intended to be limiting. It will be recognized that any suitable number of looped pressure vessels may be suspended in cavity 652. Capacitor plates on a first subset of the looped pressure vessels may be electrically coupled to capacitor plates on a second subset of the looped pressure vessels to amplify electrical signals that are provided via electrical traces, such as electrical traces 762, 764, and 766.

In some example embodiments, a lid covers cavity 652. The lid may be any suitable material, such as another wafer or portion thereof. For instance, the wafer or portion thereof that forms the lid may be electrically isolated from other electrically conductive elements in pressure sensor 600 by a layer of isolation. In one example embodiment, the lid seals cavity 652 in a vacuum to provide a designated pressure in cavity 652. For example, the designated pressure may be approximately zero atmospheres. In accordance with this example, the designated pressure may be in a range of 0.0-0.01 atmospheres, 0.0-0.05 atmospheres, 0.0-0.1 atmospheres, etc. For instance, if the designated pressure is approximately zero atmospheres, pressure sensor 600 may be insensitive to changes of temperature. In another example embodiment, the lid seals cavity 652 to provide a designated pressure of approximately one atmosphere. For instance, the designated pressure may be in a range of 0.99-1.01 atmospheres, 0.95-1.05 atmospheres, 0.9-1.1 atmospheres, etc.

The designated pressure may be determined at a time instance at which the lid is placed on pressure vessel 600. It will be recognized that bonding of the lid may be performed at a relatively high temperature. Thus, during cooling, a value of the designated pressure may decrease from a value at the time instance at which the lid is placed on pressure vessel 600 in accordance with a pressure vs. temperature relationship. It will also be recognized that if the lid seals cavity 652 in a vacuum, the designated pressure does not change during the cooling.

Figure 8:
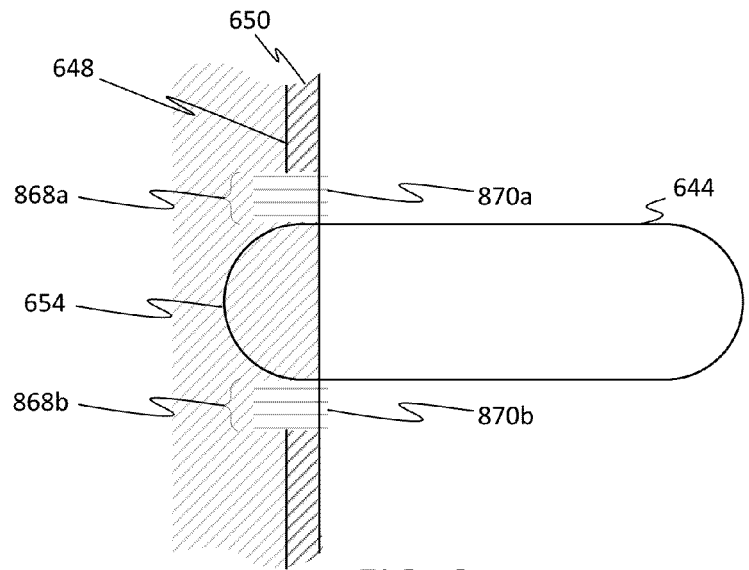
FIG. 8 shows an example implementation of a looped pressure vessel shown in FIGS. 6 and 7 in accordance with an embodiment described herein.

FIG. 8 shows an example implementation of a looped pressure vessel 644 shown in FIGS. 6 and 7 in accordance with an embodiment described herein. In particular, FIG. 8 shows that a desired electrical and pressure isolation may be achieved by using segmented isolation joints 868a and 868b between a silicon segment (e.g., silicon segment 650) and a pressure sensing vessel (e.g., looped pressure vessel 644). In FIG. 8, isolation ring 648 intersects with looped pressure vessel 644 with transition regions of segmented isolation joints 868a and 868b. Isolation joints 868a and 868b may be formed when silicon trenches 870a and 870b each fuse together during an oxidation process such that the pressure channel is broken vertically and the silicon channel is broken horizontally. Some example techniques for forming segmented isolation joints are described in U.S. Pat. App. Pub. No. 2012/0205752.

For instance, if silicon trenches 870a are close enough to each other, and an oxidation process is performed, oxidation fronts associated with silicon trenches 870a meet to provide isolation joints 868a. Similarly, if silicon trenches 870b are close enough to each other, and the oxidation process is performed, oxidation fronts associated with silicon trenches 870b meet to provide isolation joints 868b. Each of isolation joints 868a and 868b is a portion of oxide. Isolation joints 868a and 868b provide electrical isolation between silicon segment 650 and the rest of the wafer. It will be recognized that isolation joints 868a and 868b provide mechanical connections between silicon segment 650 and silicon segment 654 without pressure being transferred from isolation ring 648 to looped pressure sensor 644.

Figure 9:
FIG. 9 is a side view of a pressure sensor in accordance with an embodiment described herein.

A pressure that is to be measured may enter a pressure sensor in any of a variety of ways. For example, a pressure vessel may be routed to a vessel pressure port on a side of a wafer, and the pressure may enter the pressure sensor through the vessel pressure port. For instance, the vessel pressure port may be formed when the pressure sensor is singulated (e.g., sawed) to physically detach the pressure sensor from other pressure sensors that are formed in the wafer. In another example, a pressure channel may be routed through a lid that is placed on the wafer to provide a pressure port on top of the lid (e.g., rather than routing the pressure channel to a pressure port on the side of the wafer). FIG. 9 illustrates one example implementation in which a pressure channel is routed through a lid of a pressure sensor to a pressure port on top of the lid.

In particular, FIG. 9 is a side view of a pressure sensor 900 in accordance with an embodiment described herein. Pressure sensor 900 includes a substrate 980 (e.g., a sense wafer) and a lid 990 (e.g., a capping wafer), which caps substrate 980. Substrate 980 includes a cavity 986 in which a looped pressure vessel 982 is shown to be suspended. Looped pressure vessel 982 interfaces to an ambient pressure port 985 via an embedded pressure vessel 983 and a channel 984 in lid 990. For instance, ambient pressure port 985 may be created to connect to an ambient pressure that is to be measured. A change of direction of silicon channel 984, as shown in FIG. 9, may be accomplished by bonding two etched wafers together. The purpose of showing the direction change is to indicate that a location of ambient pressure port 985 may be placed as needed on lid 990 and is not restricted to the location vertically above the connection to embedded pressure vessel 983. Furthermore, multiple looped pressure vessels may be constructed with multiple ambient ports in order to create an array of pressure sensors.

Figure 10:
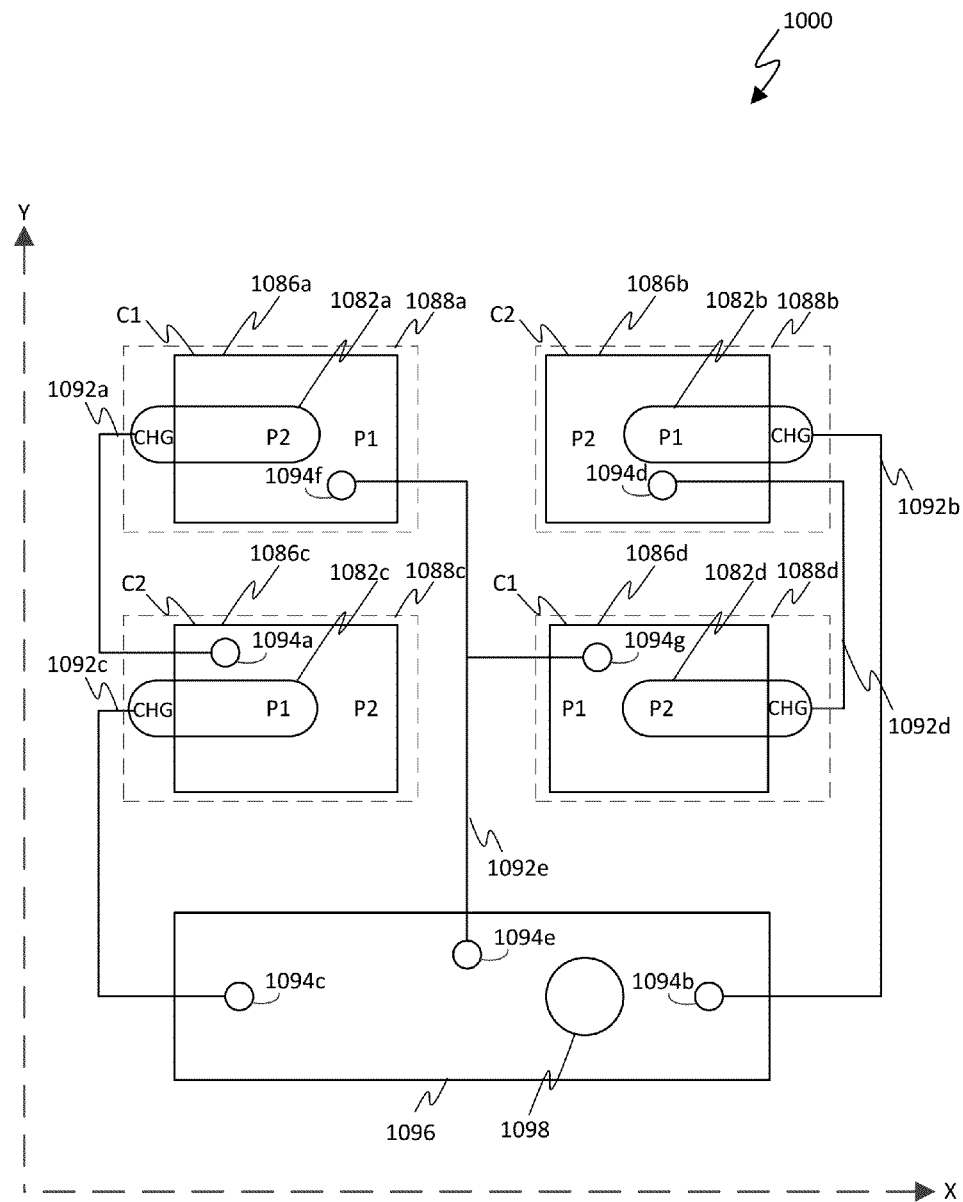
FIG. 10 is a simplified top view of a multi-cavity pressure sensor in accordance with an embodiment described herein.

FIG. 10 is a simplified top view of a multi-cavity pressure sensor 1000 in accordance with an embodiment described herein. Pressure sensor 1000 includes a first sensing element 1088a, a second sensing element 1088b, a third sensing element 1088c, and a fourth sensing element 1088d. First sensing element 1088a includes a first cavity 1086a and a first looped pressure vessel 1082a, which is suspended in first cavity 1086a. Second sensing element 1088b includes a second cavity 1086b and a second looped pressure vessel 1082b, which is suspended in second cavity 1086b. Third sensing element 1088c includes a third cavity 1086c and a third looped pressure vessel 1082c, which is suspended in third cavity 1086c. Fourth sensing element 1088d includes a fourth cavity 1086d and a fourth looped pressure vessel 1082d, which is suspended in fourth cavity 1086d.

A first pressure, P1, is shown to be in second and third looped pressure vessels 1082b and 1082c and in first and fourth cavities 1086a and 1086d (but external to first and fourth looped pressure vessels 1082a and 1082d). A second pressure, P2, is shown to be in first and fourth looped pressure vessels 1082a and 1082d and in second and third cavities 1086b and 1086c (but external to second and third looped pressure vessels 1082b and 1082c). Accordingly, first sensing element 1088a and fourth sensing element 1088d have a similar configuration. Second sensing element 1088b and third sensing element 1088c have a similar configuration.

First, second, third, and fourth sensing elements 1088a-1088d are configured as described above to compensate for (e.g., cancel) gradients in processing in the X-direction and in the Y-direction, as shown in FIG. 10. For instance, if a gradient exists in the X-direction (e.g., if slightly more metal is deposited per unit area in a region having a relatively large Y-value as compared to a region having a relatively small Y-value), the aforementioned configurations of first, second, third, and fourth sensing elements 1088a-1088d compensate for such gradient. Likewise, if a gradient exists in the Y-direction (e.g., etching is greater in a region having a relatively small X-value as compared to a region having a relatively large X-value), the aforementioned configurations compensate for such gradient.

Pressure sensor 1000 includes first, second, third, fourth, and fifth transport vessels 1092a, 1092b, 1092c, 1092d, and 1092e, each of which is configured as a pressure vessel for illustrative purposes. Transport vessels 1092a-1092e are configured in a plane of a wafer on which pressure sensing elements 1088a-1088d are fabricated. The plane of the wafer is defined by an X-axis and a Y-axis as shown in FIG. 10. First transport vessel 1092a is connected between first looped pressure vessel 1082a and third cavity 1086c. A portion of first transport vessel 1092a is removed to provide an opening 1094a in third cavity 1086c, which exposes an environment in first looped pressure vessel 1082a to an environment in third cavity 1086c. Second transport vessel 1092b is connected between second looped pressure vessel 1082b and manifold 1096. A portion of second transport vessel 1092b is removed to provide an opening 1094b in manifold 1096, which exposes an environment in second looped pressure vessel 1082b to an environment in manifold 1096.

Third transport vessel 1092c is connected between third looped pressure vessel 1082c and manifold 1096. A portion of third transport vessel 1092c is removed to provide an opening 1094c in manifold 1096, which exposes an environment in third looped pressure vessel 1082c to the environment in manifold 1096. Fourth transport vessel 1092d is connected between fourth looped pressure vessel 1082d and second cavity 1086b. A portion of fourth transport vessel 1092d is removed to provide an opening 1094d in second cavity 1086b, which exposes an environment in fourth looped pressure vessel 1082d to an environment in second cavity 1086b.

Fifth transport vessel 1092e is connected between first cavity 1086a, fourth cavity 1086d, and manifold 1096. A first portion of fifth transport vessel 1092e is included in manifold 1096. A second portion of fifth transport vessel 1092e is included in first cavity 1086a. A third portion of fifth transport vessel 1092e is included in fourth cavity 1086d. A part of the first portion of fifth transport vessel 1092e is removed to provide an opening 1094e in manifold 1096. A part of the second portion of fifth transport vessel 1092e is removed to provide an opening 1094f in first cavity 1086a. A part of the third portion of fifth transport vessel 1092e is removed to provide an opening 1094g in fourth cavity 1086d. Openings 1094e, 1094f, and 0194g expose the environment in manifold 1096 to the environments in first cavity 1086a and fourth cavity 1086d. An example pressure vessel having an opening is described in greater detail below with reference to FIG. 12.

Pressure measurement port 1098 exposes an environment of manifold 1096 to an environment (e.g., ambient environment) external to pressure sensor 1000. For instance, the first pressure P1 may enter manifold 1096 through pressure measurement port 1098. The first pressure P1 may be ported from manifold 1096 to third looped pressure vessel 1082c through third transport vessel 1092c, to second looped pressure vessel 1082b through second transport vessel 1092b, and to first cavity 1086a and fourth cavity 1086d through fifth transport vessel 1092e. In one example, the first pressure P1 may be a pressure to be measured, and the second pressure P2 may be a reference pressure. In another example, the first pressure P1 may be a reference pressure, and the second pressure P2 may be a pressure to be measured. It will be recognized that openings 1094a-1094g constitute respective vessel pressure ports.

A differential measurement may be performed by comparing the first pressure P1 and the second pressure P2 (e.g., subtracting the first pressure from the second pressure, or vice versa). Each of the looped pressure vessels 1082a-1082d includes a "CHG" silicon segment, which represents a "charge in" to pressure sensor 1000. For example, the CHG silicon segments may correspond to node 540 shown in FIG. 5. The outside of looped pressure vessels 1082a-1082d and the interior of cavities may correspond to nodes 538 and 536 shown in FIG. 5. In accordance with this example, a first carrier C1 may be applied to node 538, and a second carrier C2 may be applied to node 536, or vice versa. The first carrier C1 is associated with the outside of looped pressure vessels 1082a and 1082d and the interior of cavities 1086a and 1086d. The second carrier C2 is associated with the outside of looped pressure vessels 1082b and 1082c and the interior of cavities 1086b and 1086c. It will be recognized that multiple looped pressure vessels may be included in each of the cavities 1086a-1086d to increase an amplitude of a signal that represents the difference between the first pressure P1 and the second pressure P2 and/or to increase a signal-to-noise ratio (SNR) associated with the signal.

In an example embodiment, first sensing element 1088a, second sensing element 1088b, third sensing element 1088c, and fourth sensing element 1088d include a first capacitive structure, a second capacitive structure, a third capacitive structure, and a fourth capacitive structure, respectively. For instance, each of the first, second, third, and fourth capacitive structures may include a first capacitor plate and a second capacitor plate as described above with reference to each of the sensing elements 400a and 400b shown in FIG. 4.

In accordance with this embodiment, sensing elements, including their corresponding capacitive structures, are configured in a grid having a first diagonal and a second diagonal. For instance, the first diagonal may include a first subset of the capacitive structures (e.g., the first and fourth capacitive structures). The second diagonal may include a second subset of the capacitive structures (e.g., the second and third capacitive structures). In further accordance with this embodiment, capacitive structures in the first subset have first capacitances that increase with an increase of the first pressure P1 (e.g., relative to the second pressure P2). Capacitive structures in the second subset have second capacitances that decrease with the increase of the first pressure P1. The capacitive structures may be configured to provide a differential capacitance based on a difference between the first capacitances and the second capacitances.

FIGS. 11a-11p show cross-sections of a wafer to illustrate fabrication of a pressure sensor 1100 in accordance with embodiments described herein. As shown in FIG. 11a, fabrication of pressure sensor 1100 starts with a silicon wafer 1106. Using an oxide mask and photolithography, trenches 1102a and 1102b are etched in wafer 1106 in such a manner that respective trench openings 1101a and 1101b are smaller than respective trench bottom widths 1104a and 1104b. The oxide mask may have any suitable thickness (e.g., on the order of 0.5 microns). The oxide mask is stripped off in buffer oxide etch after the silicon etching, resulting in the silicon structure shown in FIG. 11a.

Referring now to FIG. 11b, after wafer 1106 is etched, wafer 1106 is placed in a thermal oxidation furnace at a relatively high temperature (e.g., 1100° C.) long enough to grow a suitable thickness (e.g., approximately 2.2 microns) of thermal oxide. In performing this oxidation, an upper portion of each of the trenches 1102a and 1102b pinches off and forms respective seams 1116a and 1116b, respective sidewall oxides 1121a and 1121b, and top oxide 1114. As shown in FIG. 11b, voids 1115a and 1115b are formed inside respective trenches 1102a and 1102b. It will be recognized that void 1115a need not necessarily be formed because sidewall oxide 1121a may serve as an isolation layer in pressure sensor 1100. Although the tops of trenches are sealed by respective seams 1116a and 1116b, seems 1116a and 1116b are weak points in the structure. Unless oxidations are carried out at higher temperatures than typical quartz furnaces can withstand, the seam does not fuse. It will be recognized that seem 1116a need not necessarily fuse because, as mentioned above, sidewall oxide 1121a may serve as an isolation layer.

As shown in FIG. 11c, a layer of polysilicon 1130 having a suitable thickness (e.g., a thickness of approximately 0.5 microns) be deposited to facilitate fusing of seams 1116a and 1116b. Polysilicon 1130 can be deposited undoped using low pressure chemical vapor deposition (LPCVD) or other suitable type of deposition, and the result may be substantially conformal.

Referring to FIG. 11d, once the wafer is subjected to a second oxidation, the polysilicon 1130 turns into silicon dioxide 1131 thereby sealing seams 1116a and 1116b. If needed, a chemical mechanical polishing step can be used to planarize silicon dioxide 1131 and produce flat surface 1132, as shown in FIG. 11e. The wafer is described as being formed from silicon, and the resulting oxide is described as being silicon dioxide, for illustrative purposes. It will be recognized that the wafer may be formed from any suitable semiconductor material, and the resulting oxide may be any suitable type of oxide.

As shown in FIG. 11f, a combination of photolithography and oxide etching may be used to etch a via 1140. Standard silicon contacts (or other type of contacts) can then be made using a subsequent combination of a thin screen oxidation, implantation, buffered oxide etch, aluminum deposition, photolithography, and metal etching. For instance, the aforementioned fabrication processing steps may result in metal (e.g., aluminum) trace 1141. Metal trace 1141 is an example of electric traces 762, 764, and 766.

FIG. 11g shows an intermetallic dielectric (IMD) 1142 deposited conformally over trace 1141 and the adjacent silicon dioxide layers. As shown in FIG. 11h, another aluminum trace 1151 and via 1156 are formed. In this case, the aluminum-to-aluminum interface is simply prepared using an ion beam clean prior to metal deposition. Also shown in FIG. 11h is a top oxide 1152 that is planarized with chemical-mechanical planarization (CMP) to form top flat surface 1153. Top flat surface 1153 may serve to hinder (e.g., prevent) aluminum stringers from forming in subsequent steps that are described below.

In FIG. 11i, developed photoresist patterns 1160, 1161, and 1162 are shown. Photoresist patterns 1160, 1161, and 1162 are created to define silicon mesas, pressure sense elements, and silicon connection points. It should be noted that surface 1163 is not protected by a photoresist pattern. After transferring photoresist patterns 1160, 1161, and 1162 into the underlying silicon using a combination of silicon dioxide etching and deep silicon etching, the structure shown in FIG. 11j results. As shown in FIG. 11j, a top portion of pressure vessel 1173 is etched away because pressure vessel 1173 is not protected by a photoresist pattern. Photoresist patterns 1160, 1161, and 1162 are slightly larger than the underlying structures (e.g., pressure vessel 1172 and silicon connector 1170) they are exposing to allow for typical misalignments in manufacturing. Accordingly, silicon stringers 1171 may result on the sidewalls of pressure vessels 1172 and 1173. By performing a relatively brief isotropic silicon etch using wet and/or dry chemistries, silicon stringers 1171 can be removed. If silicon stringers 1171 are not removed, they may produce unwanted asymmetries and/or unwanted signal changes due to the mismatch in coefficient of thermal expansion (CTE) between silicon stringers 1171 and the underlying silicon dioxide. The result of the isotropic silicon etch should be the clean sidewalls 1175 and 1176 as shown in FIG. 11k.

As shown in FIG. 11l, a conformal layer of metal 1177 is deposited using a sputter deposition system. Metal 1177 may be made out of aluminum or an alloy of aluminum, for example. By performing a subsequent anisotropic etch of the aluminum to remove all horizontal surfaces of metal, the device shown in FIG. 11m results. In this fabrication processing step, aluminum sidewall electrodes 1183 and 1184 become electrically separated from one another, leaving a clear oxide surface 1180 between them. Sidewall electrodes 1185a and 1185b on the sides of silicon connector 1170 connect to the silicon substrate in wafer 1106. To protect the aluminum from a later etch, a layer of silicon dioxide can be used to conformally coat electrodes 1183 and 1184.

As shown in FIG. 11n, an anisotropic etch is carried out to expose the underlying silicon substrate again, resulting in sidewall oxides 1190. To release the pressure vessel 1193 from the silicon substrate, an isotropic dry silicon etch is performed using a sulfur hexafluoride plasma, resulting in the device shown in FIG. 11o.

In FIG. 11o, silicon substrate floor 1196 results with etch artifacts 1192 under each suspended structure, such as pressure vessel 1193. Note that sidewall electrodes 1183 and 1184 on pressure vessel 1193 are not connected to residual silicon (e.g., artifacts 1192) and are not connected to each other at the bottom of pressure vessel 1193. Either of these conditions would short the sidewall electrodes 183 and 1184 together and render the suspended structures inoperable. Also note that silicon segment 1191 is isolated from the surrounding substrate silicon by isolation ring 1195 and is electrically connected to sidewall electrode 1181. Segment 1191 ultimately may be used for electrical connection to all sidewall electrodes.

As shown in FIG. 11p, the fabrication sequence may conclude with a relatively brief Primaxx® etch to remove the sidewall oxides and, if necessary, to expose any one or more of sidewall electrodes 1181, 1183, 1184, 1185a, 1185b, 1197, and/or 1198.

FIGS. 11a-11p have been described with reference to a standard silicon wafer for illustrative purposes and are not intended to be limiting. As one skilled in the art is well aware, variations that use silicon on insulator or epitaxial silicon deposited on oxide are within the scope of the embodiments described herein. It will be recognized that making the pressure sensor out of a standard silicon wafer may be desirable for cost reasons.

FIG. 12 depicts a pressure vessel 1200 having an opening 1294 in accordance with an embodiment described herein. Pressure vessel 1200 includes a first portion 1278a and a second portion 1278b. As shown in FIG. 12, a top of the second portion 1278b is etched away in an etching step. The top of the second portion 1278b is defined to be a part of the second portion 1178b that resides above a designated Y-value, YD, along the Y-axis shown in FIG. 12. For instance, the top of the second portion 1278b may be etched away as a natural part of a fabrication process that is used to fabricate an inertial sensor, such as an accelerometers or a gyroscope, merely by changing one of the masks that are used in the fabrication process. For instance, referring back to FIG. 11i, a photoresist may be used to define patterns (e.g., 1160, 1161, and 1162) that are to be etched. The patterns are intended to protect the layers that are beneath the patterns. In areas that are not protected by the patterns, etching occurs through the unprotected masking oxides and into the wafer, as illustrated in the transition from FIG. 11i to FIG. 11j.

Thus, if photoresist is placed over a pressure vessel (e.g., pressure vessel 1200), the oxide underneath the photoresist stays intact, and the pressure vessel is roughly carved out with some residuals (e.g., silicon stringers 1171) left on the sides of the pressure vessel. However, if photoresist is not placed over a pressure vessel (as shown with regard to pressure vessel 1174 in FIG. 11i), the top masking oxide is etched away, but the pressure vessel includes so much oxide that a substantial amount of the oxide remains (as shown with regard to pressure vessel 1174 in FIG. 11j). Accordingly, by placing photoresist over the first portion 1278a of pressure vessel 1200 and not placing photoresist over the second portion 1278b of pressure vessel 1200, the top of the second portion 1278b may be etched away, leaving opening 1294 in the second portion 1278b. It will be recognized that the etching step may etch the wafer around pressure vessel 1200, as well. Opening 1294 is an example implementation of any one or more of openings 1094a-1094g shown in FIG. 10. Opening 1294 may be referred to as a pressure vessel port.

FIGS. 13 and 14 depict flowcharts 1300 and 1400 of example methods for fabricating a pressure sensor in accordance with embodiments described herein. For illustrative purposes, flowcharts 1300 and 1400 are described with respect fabrication system 1500 shown in FIG. 15. As shown in FIG. 15, fabrication system 1500 includes cavity logic 1502, vessel logic 1504, capacitor logic 1506, embedding logic 1508, metallization logic 1510, and routing logic 1512. Further structural and operational embodiments will be apparent to persons skilled in the relevant art(s) based on the discussion regarding flowcharts 1300 and 1400.

As shown in FIG. 13, the method of flowchart 1300 begins at step 1302. In step 1302, a semiconductor substrate that includes a cavity is provided. In an example implementation, cavity logic 1502 provides the semiconductor substrate that includes the cavity.

At step 1304, a pressure vessel having a cross section that defines a void is fabricated. The void has a shape that is configured to change based on a change of pressure difference between a cavity pressure in the cavity and a vessel pressure in the pressure vessel. At least a portion of the pressure vessel is suspended in the cavity. In an example implementation, vessel logic 1504 fabricates the pressure vessel.

In an example embodiment, step 1304 includes shaping the pressure vessel to form an enclosed loop. In accordance with this embodiment, step 1306 further includes embedding at least a support portion of the pressure vessel in the semiconductor substrate external to the cavity. The support portion physically supports the pressure vessel. For instance, the support portion may enable the pressure vessel to be suspended in the cavity.

At step 1306, a capacitive structure coupled to the portion of the pressure vessel is fabricated. The capacitive structure is configured to provide a capacitance that changes with the shape of the void. In an example implementation, capacitor logic 1506 fabricates the capacitive structure.

In an example embodiment, step 1304 includes providing first and second oxide walls on opposing sides of an axis that is perpendicular to a top surface of the semiconductor substrate to define the void between the first and second oxide walls. In accordance with this embodiment, step 1306 includes forming first and second metallization layers on the respective first and second oxide walls.

In some example embodiments, one or more steps 1302, 1304, and/or 1306 of flowchart 1300 may not be performed. Moreover, steps in addition to or in lieu of steps 1302, 1304, and/or 1306 may be performed.

As shown in FIG. 14, the method of flowchart 1400 begins at step 1402. In step 1402, at least a support portion of a pressure vessel that is in a shape of an enclosed loop is embedded in a semiconductor substrate external to a cavity in the semiconductor substrate in which the pressure vessel is suspended. The pressure vessel has a cross section that defines a void. The void has a shape that is configured to change based on a change of pressure difference between a cavity pressure in the cavity and a vessel pressure in the pressure vessel. The enclosed loop has an inner perimeter and an outer perimeter. In an example implementation, embedding logic 1508 embeds at least the support portion of the pressure vessel in the semiconductor substrate external to the cavity.

At step 1404, first and second metallization layers are provided on respective inner and outer perimeters of the enclosed loop. The first metallization layer is electrically connected to a portion of the semiconductor substrate that is within the inner perimeter of the enclosed loop. In an example implementation, metallization logic 1510 provides the first and second metallization layers on the respective inner and outer perimeters of the enclosed loop.

At step 1406, a first metallization trace is routed from the portion of the semiconductor substrate that is within the inner perimeter of the enclosed loop to a first electrode on a top surface of the semiconductor substrate that is outside an isolation barrier that surrounds the cavity. In an example implementation, routing logic 1512 routes the first metallization trace.

At step 1408, a second metallization trace is routed from the second metallization layer to a second electrode on the top surface of the semiconductor substrate that is outside the isolation barrier. In an example implementation, routing logic 1512 routes the second metallization trace.

In some example embodiments, one or more steps 1402, 1404, 1406, and/or 1408 of flowchart 1400 may not be performed. Moreover, steps in addition to or in lieu of steps 1402, 1404, 1406, and/or 1408 may be performed.

It will be recognized that fabrication system 1500 may not include all of the logic shown in FIG. 15. For instance, fabrication system 1500 may not include one or more of cavity logic 1502, vessel logic 1504, capacitor logic 1506, embedding logic 1508, metallization logic 1510, and/or routing logic 1512. Furthermore, fabrication system 1500 may include logic in addition to or in lieu of cavity logic 1502, vessel logic 1504, capacitor logic 1506, embedding logic 1508, metallization logic 1510, and/or routing logic 1512.

FIG. 16 depicts a flowchart 1600 of an example method for using a pressure sensor in accordance with an embodiment described herein. For illustrative purposes, flowchart 1600 is described with respect to pressure sensor 600 shown in FIGS. 6-7 and measurement system 1700 shown in FIG. 17. As shown in FIG. 17, measurement system 1700 includes measurement logic 1702. Further structural and operational embodiments will be apparent to persons skilled in the relevant art(s) based on the discussion regarding flowchart 1600.

FIG. 16 depicts a flowchart 1600 of an example method for using a pressure sensor in accordance with an embodiment described herein. As shown in FIG. 16, the method of flowchart 1600 begins at step 1602. In step 1602, a cavity pressure is received in a cavity that is included in a semiconductor substrate of the pressure sensor. In an example implementation, cavity 652, which is included in semiconductor substrate 658 of pressure sensor 600, receives the cavity pressure.

At step 1604, a vessel pressure is received in a pressure vessel of the pressure sensor. At least a portion of the pressure vessel is suspended in the cavity. In an example implementation, looped pressure vessel 644 or 646 receives the vessel pressure.

At step 1606, a capacitance that changes with a shape of a void that is defined by a cross section of the pressure vessel is measured using a capacitive structure that is coupled to the portion of the pressure vessel. In an example implementation, measurement logic 1702 measures the capacitance using a capacitive structure that includes capacitor plates 432 and 430 corresponding to respective nodes 536 and 540 or capacitor plates 428 and 426 corresponding to respective nodes 540 and 538.

In an example embodiment, step 1606 includes measuring the capacitance between first and second metallization layers on respective first and second oxide walls that define the void. For instance, the first and second oxide walls may be on opposing sides of an axis that is perpendicular to a top surface of the semiconductor substrate.

In some example embodiments, one or more steps 1602, 1604, and/or 1606 of flowchart 1600 may not be performed. Moreover, steps in addition to or in lieu of steps 1602, 1604, and/or 1606 may be performed.

It will be recognized that measurement system 1700 may include logic in addition to or in lieu of measurement logic 1702. For instance, measurement system 1700 may include the pressure sensor or a portion thereof.

The materials described herein, their respective shapes and dimensions, and their relative positions shown in the figures are exemplary in nature and are not intended to be limiting. Modifications are contemplated, as would be apparent to persons skilled in the relevant art(s) having the benefit of this disclosure.

III. Example Computing System Implementation

Example embodiments, systems, components, subcomponents, devices, methods, flowcharts, steps, and/or the like described herein, including but not limited to fabrication system 1500, measurement system 1700, flowcharts 1300, 1400, and 1600 may be implemented in hardware (e.g., hardware logic/electrical circuitry), or any combination of hardware with software (computer program code configured to be executed in one or more processors or processing devices) and/or firmware. The embodiments described herein, including systems, methods/processes, and/or apparatuses, may be implemented using well known computing devices, such as computer 1800 shown in FIG. 18. For example, fabrication system 1500, measurement system 1700, each of the steps of flowchart 1300, each of the steps of flowchart 1400, and each of the steps of flowchart 1600 may be implemented using one or more computers 1800.

Computer 1800 can be any commercially available and well known communication device, processing device, and/or computer capable of performing the functions described herein, such as devices/computers available from International Business Machines®, Apple®, HP®, Dell®, Cray®, Samsung®, Nokia®, etc. Computer 1800 may be any type of computer, including a server, a desktop computer, a laptop computer, a tablet computer, a wearable computer such as a smart watch or a head-mounted computer, a personal digital assistant, a cellular telephone, etc.

Computer 1800 includes one or more processors (also called central processing units, or CPUs), such as a processor 1806. Processor 1806 is connected to a communication infrastructure 1802, such as a communication bus. In some embodiments, processor 1806 can simultaneously operate multiple computing threads. Computer 1800 also includes a primary or main memory 1808, such as random access memory (RAM). Main memory 1808 has stored therein control logic 1824 (computer software), and data.

Computer 1800 also includes one or more secondary storage devices 1810. Secondary storage devices 1810 include, for example, a hard disk drive 1812 and/or a removable storage device or drive 1814, as well as other types of storage devices, such as memory cards and memory sticks. For instance, computer 1800 may include an industry standard interface, such a universal serial bus (USB) interface for interfacing with devices such as a memory stick. Removable storage drive 1814 represents a floppy disk drive, a magnetic tape drive, a compact disk drive, an optical storage device, tape backup, etc.

Removable storage drive 1814 interacts with a removable storage unit 1816. Removable storage unit 1816 includes a computer useable or readable storage medium 1818 having stored therein computer software 1826 (control logic) and/or data. Removable storage unit 1816 represents a floppy disk, magnetic tape, compact disk (CD), digital versatile disc (DVD), Blu-ray disc, optical storage disk, memory stick, memory card, or any other computer data storage device. Removable storage drive 1814 reads from and/or writes to removable storage unit 1816 in a well-known manner.

Computer 1800 also includes input/output/display devices 1804, such as touchscreens, LED and LCD displays, keyboards, pointing devices, etc.

Computer 1800 further includes a communication or network interface 1820. Communication interface 1820 enables computer 1800 to communicate with remote devices. For example, communication interface 1820 allows computer 1800 to communicate over communication networks or mediums 1822 (representing a form of a computer useable or readable medium), such as local area networks (LANs), wide area networks (WANs), the Internet, etc. Network interface 1820 may interface with remote sites or networks via wired or wireless connections. Examples of communication interface 722 include but are not limited to a modem (e.g., for 3G and/or 4G communication(s)), a network interface card (e.g., an Ethernet card for Wi-Fi and/or other protocols), a communication port, a Personal Computer Memory Card International Association (PCMCIA) card, a wired or wireless USB port, etc. Control logic 1828 may be transmitted to and from computer 1800 via the communication medium 1822.

Any apparatus or manufacture comprising a computer useable or readable medium having control logic (software) stored therein is referred to herein as a computer program product or program storage device. Examples of a computer program product include but are not limited to main memory 1808, secondary storage devices 1810 (e.g., hard disk drive 1812), and removable storage unit 1816. Such computer program products, having control logic stored therein that, when executed by one or more data processing devices, cause such data processing devices to operate as described herein, represent embodiments. For example, such computer program products, when executed by processor 1806, may cause processor 1806 to perform any of the steps of flowchart 1300 of FIG. 13, flowchart 1400 of FIG. 14, and/or flowchart 1600 of FIG. 16.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CD ROMs, DVD ROMs, etc.), zip disks, tapes, magnetic storage devices, optical storage devices, MEMS-based storage devices, nanotechnology-based storage devices, as well as other media such as flash memory cards, digital video discs, RAM devices, ROM devices, and the like. Such computer-readable storage media may store program modules that include computer program logic to implement, for example, embodiments, systems, components, subcomponents, devices, methods, flowcharts, steps, and/or the like described herein (as noted above), and/or further embodiments described herein. Embodiments are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

The disclosed technologies can be put into practice using software, firmware, and/or hardware implementations other than those described herein. Any software, firmware, and hardware implementations suitable for performing the functions described herein can be used.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A pressure sensor comprising:
a semiconductor substrate that includes a first cavity;
a pressure vessel having a cross section that defines a void, the void having a shape that is configured to change based on a change of pressure difference between a cavity pressure in the first cavity and a vessel pressure in the pressure vessel, at least a first portion of the pressure vessel suspended in the first cavity; and
a capacitive structure coupled to the first portion of the pressure vessel, the capacitive structure configured to provide a first capacitance that changes with the shape of the void.

2. The pressure sensor of claim 1, wherein the first portion of the pressure vessel comprises:
first and second oxide walls on opposing sides of an axis that is perpendicular to a top surface of the semiconductor substrate to define the void between the first and second oxide walls; and
wherein the capacitive structure comprises:
first and second metallization layers coupled to the respective first and second oxide walls.

3. The pressure sensor of claim 1, wherein a second portion of the pressure vessel is external to the first cavity; and
wherein at least a part of the second portion is removed to provide a vessel pressure port that exposes a first environment in the pressure vessel to a second environment that is external to the pressure vessel.

4. The pressure sensor of claim 1, wherein a second portion of the pressure vessel is external to the first cavity;
wherein the semiconductor substrate includes a second cavity that is external to the first cavity;
wherein at least a part of the second portion of the pressure vessel is included in the second cavity; and
wherein the part of the second portion has an opening that exposes a first environment in the pressure vessel to a second environment in the second cavity.

5. The pressure sensor of claim 4, further comprising:
a lid that includes a hole to provide a vessel pressure port that exposes the first environment and the second environment to a third environment that is external to the pressure sensor.

6. The pressure sensor of claim 1, further comprising:
at least one additional pressure vessel, each additional pressure vessel having a respective cross section that defines a respective void, each void of the respective additional pressure vessel having a shape that is configured to change based on a change of pressure difference between the cavity pressure in the first cavity and a respective vessel pressure in the respective additional pressure vessel, at least a portion of each additional pressure vessel suspended in the first cavity;
wherein the capacitive structure is coupled to the portion of each additional pressure vessel, the capacitive structure configured to provide the first capacitance that changes also with the shape of each void of the respective additional pressure vessel.

7. The pressure sensor of claim 1, wherein the pressure vessel is in a shape of an enclosed loop; and
wherein at least a support portion of the pressure vessel is embedded in the semiconductor substrate external to the first cavity.

8. The pressure sensor of claim 1, wherein the pressure vessel is in a shape of an enclosed loop;
wherein the pressure sensor further comprises:
at least one additional pressure vessel, each additional pressure vessel having a respective cross section that defines a respective void, each void of the respective additional pressure vessel having a shape that is configured to change based on a change of pressure difference between the cavity pressure in the first cavity and a respective vessel pressure in the respective additional pressure vessel, at least a portion of each additional pressure vessel suspended in the first cavity; and
wherein each additional pressure vessel is in a shape of a respective enclosed loop.

9. The pressure sensor of claim 1, wherein the pressure vessel is in a shape of an enclosed loop, the enclosed loop having an inner perimeter and an outer perimeter; and
wherein the capacitive structure includes a first metallization layer coupled to at least a portion of the inner perimeter and a second metallization layer coupled to at least a portion of the outer perimeter.

10. The pressure sensor of claim 9, wherein the first metallization layer is electrically connected to a portion of the semiconductor substrate that is within the inner perimeter of the enclosed loop.

11. The pressure sensor of claim 10, further comprising:
a metallization trace that is configured to electrically connect the portion of the semiconductor substrate that is within the inner perimeter of the enclosed loop to an element outside the outer perimeter of the enclosed loop.

12. The pressure sensor of claim 11, wherein the second metallization layer is electrically connected to an interior portion of the semiconductor substrate that is along a perimeter of the first cavity but exterior to the inner perimeter of the enclosed loop.

13. The pressure sensor of claim 12, further comprising
a bounding isolation trench that separates the interior portion of the semiconductor substrate from a portion of the semiconductor substrate exterior to the bounding isolation trench.

14. The pressure sensor of claim 13, further comprising:
a second metallization trace that is configured to electrically connect the interior portion of the semiconductor substrate to a second element outside the bounding isolation trench.

15. The pressure sensor of claim 1, wherein the semiconductor substrate includes a second cavity that is external to the first cavity;
wherein the pressure sensor further comprises:
a second pressure vessel having a second cross section that defines a second void, the second void having a shape that is configured to change based on a change of pressure difference between a second cavity pressure in the second cavity and a second vessel pressure in the second pressure vessel, at least a portion of the second pressure vessel suspended in the second cavity; and
a second capacitive structure coupled to the portion of the second pressure vessel, the second capacitive structure configured to provide a second capacitance that changes with the shape of the second void;

wherein the first vessel pressure in the first pressure vessel and the second cavity pressure in the second cavity are same;

wherein the second vessel pressure in the second pressure vessel and the first cavity pressure in the first cavity are same; and wherein the second vessel pressure is a reference pressure.

16. The pressure sensor of claim 15, further comprising:
a lid that covers the first cavity, the lid sealing the first cavity in a vacuum to provide the first cavity pressure.

17. The pressure sensor of claim 15, further comprising:
a lid that covers the first cavity, the lid sealing the first cavity to provide the first cavity pressure of approximately one atmosphere.

18. The pressure sensor of claim 15, further comprising:
a transport vessel that includes an interior pressure port and an exterior pressure port, the interior pressure port opening into the first cavity, the exterior pressure port opening to a region in which the first pressure is to be measured.

19. The pressure sensor of claim 18, wherein the first capacitive structure and the second capacitive structure are configured to provide a differential capacitance measurement that represents a pressure difference between the first vessel pressure and the second vessel pressure.

20. The pressure sensor of claim 1, further comprising:
a lid that covers the first cavity, the lid sealing the first cavity in a vacuum to provide the cavity pressure.

21. The pressure sensor of claim 1, further comprising:
a lid that covers the first cavity, the lid sealing the first cavity to provide the cavity pressure of approximately one atmosphere.

22. The pressure sensor of claim 1, comprising a plurality of capacitive structures configured in a grid having a first diagonal that includes a first subset of the plurality of capacitive structures and a second diagonal that includes a second subset of the plurality of capacitive structures, the plurality of capacitive structures including the first capacitive structure;
wherein first capacitances of capacitive structures in the first subset increase with an increase of a measurement pressure; and
wherein second capacitances of capacitive structures in the second subset decrease with the increase of the measurement pressure; and
wherein the plurality of capacitive structures is configured to provide a differential capacitance based on a difference between the first capacitances and the second capacitances.

23. A method comprising:
providing a semiconductor substrate that includes a cavity;
fabricating a pressure vessel having a cross section that defines a void, the void having a shape that is configured to change based on a change of pressure difference between a cavity pressure in the cavity and a vessel pressure in the pressure vessel, at least a portion of the pressure vessel suspended in the cavity; and
fabricating a capacitive structure coupled to the portion of the pressure vessel, the capacitive structure configured to provide a capacitance that changes with the shape of the void.

24. The method of claim 23, wherein fabricating the pressure vessel comprises:
providing first and second oxide walls on opposing sides of an axis that is perpendicular to a top surface of the semiconductor substrate to define the void between the first and second oxide walls; and
wherein fabricating the capacitive structure comprises:
forming first and second metallization layers on the respective first and second oxide walls.

25. The method of claim 23, wherein fabricating the pressure vessel comprises:
shaping the pressure vessel to form an enclosed loop; and
embedding at least a support portion of the pressure vessel in the semiconductor substrate external to the cavity.

26. A method comprising:
embedding at least a support portion of a pressure vessel that is in a shape of an enclosed loop in a semiconductor substrate external to a cavity in the semiconductor substrate in which the pressure vessel is suspended, the pressure vessel having a cross section that defines a void, the void having a shape that is configured to change based on a change of pressure difference between a cavity pressure in the cavity and a vessel pressure in the pressure vessel, the enclosed loop having an inner perimeter and an outer perimeter;
providing first and second metallization layers on respective inner and outer perimeters of the enclosed loop, the first metallization layer being electrically connected to a portion of the semiconductor substrate that is within the inner perimeter of the enclosed loop;
routing a first metallization trace from the portion of the semiconductor substrate that is within the inner perimeter of the enclosed loop to a first electrode on a top surface of the semiconductor substrate that is outside an isolation barrier that surrounds the cavity; and
routing a second metallization trace from the second metallization layer to a second electrode on the top surface of the semiconductor substrate that is outside the isolation barrier.

27. A method comprising:
receiving a cavity pressure in a cavity that is included in a semiconductor substrate of a pressure sensor;
receiving a vessel pressure in a pressure vessel of the pressure sensor, at least a portion of the pressure vessel being suspended in the cavity; and
measuring a capacitance that changes with a shape of a void that is defined by a cross section of the pressure vessel using a capacitive structure that is coupled to the portion of the pressure vessel.

28. The method of claim 27, wherein measuring the capacitance comprises:
measuring the capacitance between first and second metallization layers on respective first and second oxide walls that define the void and that are on opposing sides of an axis that is perpendicular to a top surface of the semiconductor substrate.

* * * * *